United States Patent
Doney et al.

(10) Patent No.: US 12,430,639 B2
(45) Date of Patent: *Sep. 30, 2025

(54) METHOD, SYSTEM, AND COMPUTER-READABLE MEDIUM FOR SECURED MULTI-LATERAL DATA EXCHANGE OVER A COMPUTER NETWORK

(71) Applicant: Securrency, Inc., Annapolis, MD (US)

(72) Inventors: George Daniel Doney, Riva, MD (US); Ihor Yermakov, Arlington, VA (US); Manuel Rensink, Abu Dhabi (AE)

(73) Assignee: DTCC DIGITAL (US) INC., Jersey City, NJ (US)

(*) Notice: Subject to any disclaimer, the term of this patent is extended or adjusted under 35 U.S.C. 154(b) by 206 days.

This patent is subject to a terminal disclaimer.

(21) Appl. No.: 18/224,353

(22) Filed: Jul. 20, 2023

(65) Prior Publication Data
US 2023/0360042 A1 Nov. 9, 2023

Related U.S. Application Data

(63) Continuation-in-part of application No. 17/211,432, filed on Mar. 24, 2021, now Pat. No. 11,710,124.

(60) Provisional application No. 62/993,882, filed on Mar. 24, 2020.

(51) Int. Cl.
*G06Q 20/38* (2012.01)
*G06Q 20/02* (2012.01)
*G06Q 20/36* (2012.01)

(52) U.S. Cl.
CPC ........ *G06Q 20/3829* (2013.01); *G06Q 20/02* (2013.01); *G06Q 20/3674* (2013.01)

(58) Field of Classification Search
CPC .............. G06Q 20/3829; G06Q 20/02; G06Q 20/3674; G06Q 20/065
See application file for complete search history.

(56) References Cited

U.S. PATENT DOCUMENTS

| | | | |
|---|---|---|---|
| 6,311,171 B1 * | 10/2001 | Dent | G06Q 20/02 |
| | | | 705/64 |
| 8,316,237 B1 * | 11/2012 | Felsher | H04L 9/3249 |
| | | | 380/282 |
| 10,193,696 B2 | 1/2019 | Struttmann et al. | |
| 10,489,597 B2 | 11/2019 | Safford et al. | |
| 10,673,626 B2 | 6/2020 | Sandberg-Maitland et al. | |
| 10,735,202 B2 | 8/2020 | Jayachandran et al. | |

(Continued)

OTHER PUBLICATIONS

Renjith P. et al., Verifiable El-Gamal Re-encryption with Authenticity in Cloud, Jul. 4-6, 2013, IEEE (Year: 2013).*

(Continued)

*Primary Examiner* — John W Hayes
*Assistant Examiner* — Yingying Zhou
(74) *Attorney, Agent, or Firm* — NEO IP

(57) ABSTRACT

A system and method for secured, multi-lateral, assured data transfer over a computer network for the assured exchange of data between counterparties related to qualifying transactions, the method being accomplished by a distributed computing system including a distributed ledger platform and an off-chain data host platform. On-chain authorization tokens are used to track data access rights, enforce access policies, and control distribution of encryption keys.

10 Claims, 9 Drawing Sheets

(56) References Cited

U.S. PATENT DOCUMENTS

| | | | |
|---|---|---|---|
| 11,159,307 B2 | 10/2021 | Bathen et al. | |
| 11,194,837 B2 | 12/2021 | Vo et al. | |
| 11,200,569 B1* | 12/2021 | James | G06Q 20/381 |
| 11,250,423 B2 | 2/2022 | Heyner | |
| 11,250,466 B2 | 2/2022 | Soundararajan et al. | |
| 11,301,460 B2 | 4/2022 | Rich et al. | |
| 11,308,487 B1* | 4/2022 | Foster | G06Q 20/3829 |
| 11,488,147 B2 | 11/2022 | Sheng et al. | |
| 11,488,161 B2 | 11/2022 | Soundararajan et al. | |
| 11,551,191 B2 | 1/2023 | McNamara et al. | |
| 2003/0190046 A1* | 10/2003 | Kamerman | H04L 9/3265 |
| | | | 713/176 |
| 2005/0257045 A1* | 11/2005 | Bushman | H04L 63/12 |
| | | | 713/156 |
| 2017/0103385 A1* | 4/2017 | Wilson, Jr. | G06Q 20/38215 |
| 2018/0101844 A1* | 4/2018 | Song | H04L 9/30 |
| 2019/0287175 A1* | 9/2019 | Hill | G06Q 40/04 |
| 2020/0127834 A1* | 4/2020 | Westland | H04L 63/00 |
| 2021/0042735 A1 | 2/2021 | Majidi et al. | |
| 2021/0192501 A1 | 6/2021 | McNamara et al. | |
| 2021/0377263 A1 | 12/2021 | Law | |
| 2022/0012358 A1* | 1/2022 | Gaddam | H04L 9/3247 |
| 2022/0051261 A1 | 2/2022 | Vetas | |
| 2022/0270080 A1 | 8/2022 | Yantis et al. | |
| 2022/0391901 A1* | 12/2022 | Park | H04L 63/0823 |

OTHER PUBLICATIONS

Liu et al., Studied on Application of Doble Encryption Algorithm in Covert Channel Transmission, 2018, IEEE, International Conference on Intelligent Transportation, Big Data & Smart City, pp. 210-213. (Year: 2018).*

* cited by examiner

METHOD, SYSTEM, AND COMPUTER-READABLE MEDIUM FOR SECURED MULTI-LATERAL DATA EXCHANGE OVER A COMPUTER NETWORK

CROSS REFERENCES TO RELATED APPLICATIONS

This application is related to and claims priority from the following U.S. patents and patent applications. This application is a continuation-in-part of U.S. application Ser. No. 17/211,432, filed Mar. 24, 2021, which claims priority to and the benefit of U.S. Provisional Patent Application No. 62/993,882, filed Mar. 24, 2020, each of which is incorporated herein by reference in its entirety.

BACKGROUND OF THE INVENTION

1. Field of the Invention

The present invention relates to data exchange on a distributed ledger, and more specifically to securing and managing assured data exchange between multiple parties on a distributed ledger upon the completion of a qualifying event.

2. Description of the Prior Art

It is generally known in the prior art to provide computer platforms for exchanging data on a distributed ledger.

Prior art patent documents include the following:

US Patent Publication No. 2021/0192501 for Network computing system implementing on-demand liquidity to facilitate direct cross-medium transactions by inventors McNamara et al., filed Feb. 21, 2020, and published Jun. 4, 2021, is directed to a computing system that can provide on-demand liquidity for cross-medium transactions using direct wallet-to-wallet transfers of digital currency. The system can acquire exchange rate information from multiple sources and generate a guaranteed exchange rate and trade instructions to the originating and recipient clients to execute the transaction.

US Patent Publication No. 2021/0042735 for System and method for controlling an application programming interface endpoint for transferring funds by inventor Majidi et al., filed Aug. 6, 2019 and published Feb. 11, 2021, is directed to a system and method for controlling anomalous access to tables. A call including a source token and a destination token is received from a caller. A first type of token and a first type of wallet corresponding to the source token are identified. A second type of token and a second type of wallet corresponding to the destination token are further identified. A transaction is determined based on the first type of token, the first type of wallet, the second type of token, and the second type of wallet. A response quote is sent to the caller. The response quote includes details about the transaction and a request for confirmation.

US Patent Publication No. 2022/0270080 for Authenticating physical items in a tokenization workflow by inventor Yantis et al., filed May 13, 2022, and published Aug. 25, 2022, is directed to methods for authenticating items in part of a tokenization workflow. In embodiments, the method includes receiving a photograph of, and information relating to, an item, and generating a virtual representation of the item. The item may be authenticated by making an authentication request via a portal to subject-matter authentication experts, wherein the portal displays the virtual representation of the item in the portal. An authentication report may be received from the experts, and a non-fungible digital token having a unique token identifier may be generated. The non-fungible token may be cryptographically linked to the virtual representation of the item on a cryptographic ledger and ownership data of the non-fungible token is updated to associate an account of an owner of the item with the digital token on the cryptographic ledger.

U.S. Pat. No. 11,551,191 for Network computing system executing programmatic adapters to implement asynchronous communications by inventors McNamara et al., filed Jan. 25, 2021, and issued Jan. 10, 2023, is directed to a computing system that can establish asynchronous network communications with exchanges to facilitate cross-medium transactions between originating and recipient clients. Such communications can result in filtering out errant responses that would otherwise cause an open transaction to fail.

U.S. Pat. No. 11,488,161 for Systems and methods for providing transaction provenance of off-chain transactions using distributed ledger transactions with secured representations of distributed ledger addresses of transacting parties by inventors Soundararaj an at al., filed Jul. 31, 2018, and issued Nov. 1, 2022, is directed to proving and creating on a distributed ledger a verifiable transaction record of a transaction between a user associated with user device and an agent associated with agent system, where the identities of the user and agent are hidden.

U.S. Pat. No. 11,488,147 for the Computationally efficient transfer processing and auditing apparatuses, methods and systems by inventors Sheng at al., filed Apr. 12, 2017, and issued Nov. 1, 2022, is directed to the Computationally Efficient Transfer Processing, Auditing, and Search Apparatuses, Methods and Systems ("SOCOACT") which transforms smart contract request, crypto currency deposit request, crypto collateral deposit request, crypto currency transfer request, crypto collateral transfer request inputs via SOCOACT components into transaction confirmation outputs. Also, SOCOACT transforms transaction record inputs via SOCOACT components into matrix and list tuple outputs for computationally efficient auditing. A blockchain transaction data auditing apparatus comprises a blockchain recordation component, a matrix Conversion component, and a bloom filter component. The blockchain recordation component receives a plurality of transaction records for each of a plurality of transactions, each transaction record comprising a source address, a destination address, a transaction amount and a timestamp of a transaction; the source address comprising a source wallet address corresponding to a source digital wallet, and the destination address comprising a destination wallet address corresponding to a destination virtual currency wallet; verifies that the transaction amount is available in the source virtual currency wallet; and when the transaction amount is available, cryptographically records the transaction in a blockchain comprising a plurality of hashes of transaction records. The Bloom Filter component receives the source address and the destination address, hashes the source address using a Bloom Filter to generate a source wallet address, and hashes the destination address using the Bloom Filter to generate a destination wallet address. The Matrix Conversion component adds the source wallet address as a first row and a column entry to a stored distance matrix representing the plurality of transactions, adds the destination wallet address as a second row and column entry to the stored distance matrix representing the plurality of transactions, adds the transaction amount and the timestamp as an entry to the row corresponding to the source wallet address and the column corresponding to the destination wallet address; and generate a list representation of the matrix, where each entry in the list comprises a tuple having the source wallet address, the destination wallet address, the transaction amount and the timestamp.

U.S. Pat. No. 11,301,460 for Platform for creating and using actionable non-fungible tokens (KNFT) by inventors Rich at al., filed Jan. 23, 2020, and issued Apr. 12, 2022, is directed to a distributed computing platform and method for creating actionable digital assets and tokens incorporating influence and outreach ("KNFT"). A KNFT application server may be configured to receive, over a distributed computing network from a remote computing node, a request for a new non-fungible token wherein the KNFT comprises a unique KNFT identifier, at least one metadata element, and least one social vector. A blockchain proxy server may be operatively connected to the KNFT application server and to a distributed blockchain ledger. Social actions may comprise user comment, connection, direct message, like, or favorable rating, and a change in ownership of the KNFT may be written to the social vector by a KNFT API. The social vector may comprise social vector data from at least one prior owner, and the KNFT may further comprise a circulation trail vector that incorporates the ownership history of the KNFT.

U.S. Pat. No. 11,194,837 for Blockchain implementing cross-chain transactions by inventors Huang Tam Vo et al., filed May 1, 2018, and issued Dec. 7, 2021, is directed to an example operation may include one or more of receiving a request to execute a cross-chain transaction, identifying disparate locations of two or more different blockchains that have stored therein data for the cross-chain transaction, retrieving data from data blocks of the two or more different blockchains, respectively, based on the identified disparate locations, executing the cross-chain transaction which takes the retrieved data from the two or more different blockchains as inputs to generate a cross-chain result, and storing the cross-chain result via a data block of a distributed ledger.

U.S. Pat. No. 10,198,696 for Using a tree structure to segment and distribute records across one or more decentralized, acylic graphs of cryptographic hash pointers by inventors Struttman at al., filed Mar. 10, 2018, and issued Jan. 29, 2019, is directed to a process including: receiving with one or more processors, a first request to store a record from a computing entity; encoding, with one or more processors, the record in a first plurality of segments; arranging, with one or more processors, the first plurality of segments in respective content nodes of a first content graph, wherein at least some content nodes of the first content graph have two or more content edges of the first content graph pointing to two or more respective other content nodes of the first content graph; and storing, with one or more processors, the content nodes of the first content graph in a verification graph.

SUMMARY OF THE INVENTION

The present invention relates to systems for ensured mutual data exchange, where the exchange of data is conditional upon a qualifying transaction.

It is an object of this invention to create a system that is compliant with recommendations regarding the availability of information in during transfer of digital assets. Further, the present invention seeks to ensure that data will not be freely available to interested parties but rather is only made available upon the execution of a transaction between parties.

In one embodiment, the present invention includes a method for mutual exchange of data over a distributed ledger, including, creating a key for data encryption, wherein a sending party encrypts a data set using the key to create an encrypted data set, sending the encrypted data set to a data host platform, wherein the data host platform is implemented on a distributed ledger, generating a pointer upon receipt of the encrypted data set, wherein the pointer stores a memory of the location of the encrypted data set within the data host platform, encrypting the key using a public key associated with a receiving party to create an encrypted key, the data host platform receiving a request from the sending party to create at least one authorization token, wherein the at least one authorization token is created, wherein the at least one authorization token includes the encrypted key, the pointer, and a unique token address for association with the at least one authorization token, the data host platform transferring the at least one authorization token from a wallet address associated with the sending party to a wallet address associated with the receiving party upon receiving a request to transfer the at least one authorization token from the sending party, the data host platform receiving a decrypted key from the receiving party, wherein the receiving party decrypts the encrypted key using the private key associated with the public address to create the decrypted key and access the pointer, the data host platform receiving the pointer of the at least one authorization token indicating the location of encrypted data set from the receiving party, wherein the data host platform further encrypts the encrypted data set using the public key of the receiving party to create a twice encrypted data set, the data host platform sending the twice encrypted data set to the receiving party, wherein the receiving party decrypts the twice encrypted data set using a private key associated with the receiving party to access the encrypted key and the encrypted data set, the receiving party decrypting the encrypted key to access the key, decrypting the encrypted data set using the key, wherein the receiving party is able to view the data set upon decryption.

In another embodiment, the present invention includes a system for secure, mutual exchange of data over a distributed ledger, including, a decentralized computer platform and a remote server, wherein the decentralized computer platform is implemented on a distributed ledger, wherein the decentralized computer platform includes a data host platform including a data store and an attestation registry, wherein the decentralized computer platform is in network connection with the remote server, wherein the data host platform supports at least one sending party, at least one receiving party, and at least one third-party administrator, wherein the at least one third-party administrator certifies the at least one sending party, wherein the certification of the at least one sending party enables the at least one sending party to initiate the transmission of data via the decentralized computer platform, wherein information pertaining to the certification of the at least one sending party is stored in the attestation registry of the data host platform, wherein the at least one receiving party is certified by the at least one third-party administrator, wherein the at least one sending party creates a key for data encryption, wherein the data is encrypted using the key to create encrypted data, wherein the encrypted data is sent to the data store of the data host platform, wherein the data host platform generates a pointer including a memory of the location of the encrypted data within the data store, wherein the at least one sending party encrypts the key using a public key of the at least one receiving party, wherein the at least one sending party generates and signs a request for creating at least one authorization token, wherein the request is transmitted to the data host platform, wherein, upon verification of the signed request, the data host platform generates at least one authorization token, wherein the at least one authorization token includes the pointer, the encrypted key, and a unique token identifier, wherein the sending party is operable to send the at least one authorization token directly to a computer address of the at least one receiving party, wherein the receiving party transfers the authorization token to the data host platform, wherein the pointer of the authorization token indicates the encrypted data, wherein the data host platform retrieves the encrypted data, wherein the data host platform further encrypts the encrypted data using the public key of the at least one receiving party to create twice encrypted data, wherein the data host platform sends the twice encrypted data and the at least one authorization token to the at least one receiving party, wherein the at least one receiving party decrypted the twice encrypted data using the private key associated with the at least one receiving party to access the encrypted data, wherein the at least one receiving party decrypts the encrypted key of the authorization token to create the key, wherein the at least one receiving party decrypts the encrypted data using the key, wherein the at least one receiving party is operable to view the decrypted data.

In yet another embodiment, the present invention includes a system for secure, mutual exchange of data over a distributed ledger, including, a decentralized computer platform including a data host platform, the data host platform including a data store, a regulatory compliance dashboard, and an attestation registry, and a remote server, wherein the decentralized computer platform is implemented on a distributed ledger, wherein the decentralized computer platform is in network connection with the remote server, wherein the data host platform supports at least one sending party, at least one receiving party, and at least one third-party administrator, wherein the at least one third-party administrator certifies the at least one sending party, wherein the certification of the at least one sending party enables the at least one sending party to initiate the transmission of data via the decentralized computer platform, wherein information pertaining to the certification of the at least one sending party is stored in the attestation registry of the data host platform, wherein the at least one receiving party is certified by the at least one third-party administrator and/or verified by a certified third-party Virtual Asset Service Provider (VASP), wherein the at least one sending party creates a key for data encryption, wherein the data is encrypted using the key to create encrypted data, wherein the encrypted data is sent to the data store of the data host platform, wherein the data host platform generates a pointer including a memory of the location of the encrypted data within the data store, wherein the at least one sending party encrypts the key using a public key of the at least one receiving party, wherein the at least one sending party generates and signs a request for creating at least one authorization token including the pointer, the encrypted key, and a unique token identifier, wherein the request is transmitted to the data host platform, wherein, upon verification of the signed request, the data host platform generates at least one authorization token, wherein the sending party is operable to send the at least one authorization token directly to a computer address of the at least one receiving party, wherein the receiving party transfers the authorization token to the data host platform, wherein the pointer of the authorization token indicates the encrypted data, wherein the data host platform is operable to verify that a transaction has occurred between the at least one sending party and the at least one receiving party, wherein the retrieval of the encrypted data is conditional upon the transaction, wherein the data host platform retrieves the encrypted data after verifying the transaction has occurred, wherein the data host platform further encrypts the encrypted data using the public key of the at least one receiving party to create twice encrypted data, wherein the data host platform sends the twice encrypted data and the at least one authorization token to the at least one receiving party, wherein the at least one receiving party decrypted the twice encrypted data using the private key associated with the at least one receiving party to access the encrypted data, wherein the at least one receiving party decrypts the encrypted key of the authorization token to create the key, wherein the at least one receiving party decrypts the encrypted data using the key, wherein the at least one receiving party is operable to view the decrypted data.

These and other aspects of the present invention will become apparent to those skilled in the art after a reading of the following description of the preferred embodiment when considered with the drawings, as they support the claimed invention.

DETAILED DESCRIPTION

Figure 1:
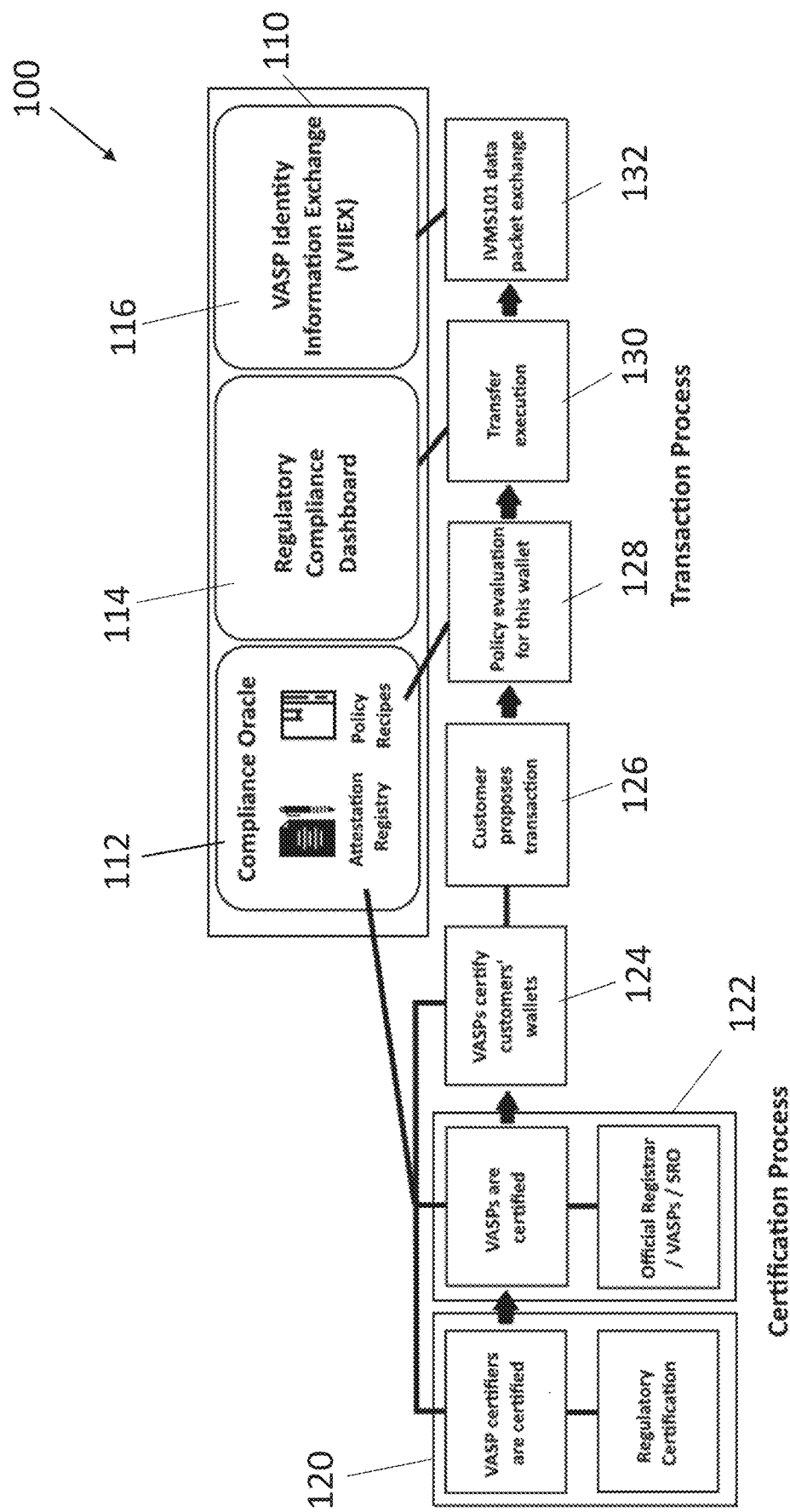
FIG. 1 is a block diagram of a workflow according to one embodiment of the present invention.

The present invention is generally directed to systems for ensured mutual data exchange, where the exchange of data is conditional upon a qualifying transaction.

In one embodiment, the present invention includes a method for mutual exchange of data over a distributed ledger, including, creating a key for data encryption, wherein a sending party encrypts a data set using the key to create an encrypted data set, sending the encrypted data set to a data host platform, wherein the data host platform is implemented on a distributed ledger, generating a pointer upon receipt of the encrypted data set, wherein the pointer stores a memory of the location of the encrypted data set within the data host platform, encrypting the key using a public key associated with a receiving party to create an encrypted key, the data host platform receiving a request from the sending party to create at least one authorization token, wherein the at least one authorization token is created, wherein the at least one authorization token includes the encrypted key, the pointer, and a unique token address for association with the at least one authorization token, the data host platform transferring the at least one authorization token from a wallet address associated with the sending party to a wallet address associated with the receiving party upon receiving a request to transfer the at least one authorization token from the sending party, the data host platform receiving a decrypted key from the receiving party, wherein the receiving party decrypts the encrypted key using the private key associated with the public address to create the decrypted key and access the pointer, the data host platform receiving the pointer of the at least one authorization token indicating the location of encrypted data set from the receiving party, wherein the data host platform further encrypts the encrypted data set using the public key of the receiving party to create a twice encrypted data set, the data host platform sending the twice encrypted data set to the receiving party, wherein the receiving party decrypts the twice encrypted data set using a private key associated with the receiving party to access the encrypted key and the encrypted data set, the receiving party decrypting the encrypted key to access the key, decrypting the encrypted data set using the key, wherein the receiving party is able to view the data set upon decryption.

In another embodiment, the present invention includes a system for secure, mutual exchange of data over a distributed ledger, including, a decentralized computer platform and a remote server, wherein the decentralized computer platform is implemented on a distributed ledger, wherein the decentralized computer platform includes a data host platform including a data store and an attestation registry, wherein the decentralized computer platform is in network connection with the remote server, wherein the data host platform supports at least one sending party, at least one receiving party, and at least one third-party administrator, wherein the at least one third-party administrator certifies the at least one sending party, wherein the certification of the at least one sending party enables the at least one sending party to initiate the transmission of data via the decentralized computer platform, wherein information pertaining to the certification of the at least one sending party is stored in the attestation registry of the data host platform, wherein the at least one receiving party is certified by the at least one third-party administrator, wherein the at least one sending party creates a key for data encryption, wherein the data is encrypted using the key to create encrypted data, wherein the encrypted data is sent to the data store of the data host platform, wherein the data host platform generates a pointer including a memory of the location of the encrypted data within the data store, wherein the at least one sending party encrypts the key using a public key of the at least one receiving party, wherein the at least one sending party generates and signs a request for creating at least one authorization token, wherein the request is transmitted to the data host platform, wherein, upon verification of the signed request, the data host platform generates at least one authorization token, wherein the at least one authorization token includes the pointer, the encrypted key, and a unique token identifier, wherein the sending party is operable to send the at least one authorization token directly to a computer address of the at least one receiving party, wherein the receiving party transfers the authorization token to the data host platform, wherein the pointer of the authorization token indicates the encrypted data, wherein the data host platform retrieves the encrypted data, wherein the data host platform further encrypts the encrypted data using the public key of the at least one receiving party to create twice encrypted data, wherein the data host platform sends the twice encrypted data and the at least one authorization token to the at least one receiving party, wherein the at least one receiving party decrypted the twice encrypted data using the private key associated with the at least one receiving party to access the encrypted data, wherein the at least one receiving party decrypts the encrypted key of the authorization token to create the key, wherein the at least one receiving party decrypts the encrypted data using the key, wherein the at least one receiving party is operable to view the decrypted data.

In yet another embodiment, the present invention includes a system for secure, mutual exchange of data over a distributed ledger, including, a decentralized computer platform including a data host platform, the data host platform including a data store, a regulatory compliance dashboard, and an attestation registry, and a remote server, wherein the decentralized computer platform is implemented on a distributed ledger, wherein the decentralized computer platform is in network connection with the remote server, wherein the data host platform supports at least one sending party, at least one receiving party, and at least one third-party administrator, wherein the at least one third-party administrator certifies the at least one sending party, wherein the certification of the at least one sending party enables the at least one sending party to initiate the transmission of data via the decentralized computer platform, wherein information pertaining to the certification of the at least one sending party is stored in the attestation registry of the data host platform, wherein the at least one receiving party is certified by the at least one third-party administrator and/or verified by a certified third-party Virtual Asset Service Provider (VASP), wherein the at least one sending party creates a key for data encryption, wherein the data is encrypted using the key to create encrypted data, wherein the encrypted data is sent to the data store of the data host platform, wherein the data host platform generates a pointer including a memory of the location of the encrypted data within the data store, wherein the at least one sending party encrypts the key using a public key of the at least one receiving party, wherein the at least one sending party generates and signs a request for creating at least one authorization token including the pointer, the encrypted key, and a unique token identifier, wherein the request is transmitted to the data host platform, wherein, upon verification of the signed request, the data host platform generates at least one authorization token, wherein the sending party is operable to send the at least one authorization token directly to a computer address of the at least one receiving party, wherein the receiving party transfers the authorization token to the data host platform, wherein the pointer of the authorization token indicates the encrypted data, wherein the data host platform is operable to verify that a transaction has occurred between the at least one sending party and the at least one receiving party, wherein the retrieval of the encrypted data is conditional upon the transaction, wherein the data host platform retrieves the encrypted data after verifying the transaction has occurred, wherein the data host platform further encrypts the encrypted data using the public key of the at least one receiving party to create twice encrypted data, wherein the data host platform sends the twice encrypted data and the at least one authorization token to the at least one receiving party, wherein the at least one receiving party decrypted the twice encrypted data using the private key associated with the at least one receiving party to access the encrypted data, wherein the at least one receiving party decrypts the encrypted key of the authorization token to create the key, wherein the at least one receiving party decrypts the encrypted data using the key, wherein the at least one receiving party is operable to view the decrypted data.

None of the prior art discloses secondary encryption of data by a data host platform implemented on a distributed ledger. Further, none of the prior art discloses the creation of an authorization token containing a pointer for indicating the location of encrypted data within a data host platform. Further still, none of the prior art discloses the decryption of twice encrypted data with a private key, decrypting an encrypted key, and using the decrypted key to decrypt the encrypted data.

There are many situations in which data must be exchanged over a computer network in a secure manner. For example, sensitive Personally Identifying Information (PII) is often transmitted over computer networks for medical diagnosis, regulation of financial transactions and other purposes. Further, there are applications in which a party should not, or does not want to, transmit data to other parties unless the transmitting party can be assured the other parties will reciprocate in transferring secured information back the party or to other parties. Such applications include regulated financial transactions, media licensing, permissions delegation applications and the like. In media licensing, different domains can share license information with each other to allow use of licensed content on various domains based on a license from a specific domain. Each domain my want to be assured that the other domains will do the same and share content use information, billing information, and the like. In permissions delegation, one party may wish to delegate digital rights (to use of a service or the like) to another party. The delegating party might want to ensure that the delegated party will provide the proper use information, billing information, or the like.

An example of transactions that require counterparties to conduct and assured exchange of confidential data on the completion of qualifying events are financial transactions. Certain guidelines on virtual assets were released by the Financial Action Task Force (FATF) in order to enforce identification of parties involved in virtual asset (e.g., cryptocurrencies and other tokenized assets represented in digital form) transactions on pseudonymous blockchain networks. Such identity verification combats money laundering and financing of crime and terrorism. Conventionally, virtual asset transactions are conducted over distributed ledger networks using "wallets", which correspond to a network address operated by one or more cryptographic keys that correspond to, but do not reveal, a party's identity. This allows parties to remain anonymous while transacting via networked payments. The guidelines, known as Financial Action Task Force Recommendation 16 or the "Travel Rule", require digital asset financial service intermediaries, that is Virtual Asset Service Providers (VASPs), to provide data identifying all participants in a value transfer. Beyond traditional Know Your Customer (KYC) responsibilities for its own clients, the VASP must also identify client counterparties (i.e., Know Your Client Counterparties (KYCC) even if the counterparties are clients of other VASPs. To conform to the guidelines, VASPs must exchange Personally Identifying Information (PII) of the customers involved in a transaction.

In accordance with the guidelines, to participate in the financial ecosystem, VASPs must be certified for proper KYC verification processes, protection of PII data, and an ability to meet the data exchange requirements specified in the guidelines. One of ordinary skill in the art will appreciate that the KYC verification process is the mandatory process of identifying and verifying the identity of the client associated with an account, the KYC status of which is then considered to be verified. VASPs may not share PII information with unauthorized parties. According to regulatory standards this data may only be shared in the context of a qualifying transaction to meet regulatory requirements. However, a VASP initiating transfer of PII information requires assurance that the necessary data can and will be made accessible, in a secured manner, by the counterparty VASP once a qualifying transaction occurs (but not before). Since client data is sensitive to a VASP business and would not be shared willingly with a competing VASP, the initiating VASP providing this information in the context of a qualifying transaction needs assurance that the receiving VASP will reciprocate by verifying the identity of the counterparty. Without this assurance, the initiating VASP would be out of compliance (unable to meet reporting requirements) if it allows a transaction and the receiving VASP does not reciprocate the sharing requirements (i.e., no mutual exchange of data occurs).

One of ordinary skill in the art will appreciate the failure to complete a transaction from an initiating VASP to a receiving VASP after client PII data has been shared would result in any number of punishments under the General Data Protection Regulation (GDPR) and the California Consumer Privacy Act. Further, the VASP which shares client PII without a qualifying transaction presents the possibility for general lawsuits for damages resulting from leaking client information to another VASP. Further still, there are significant competitive disadvantages for leaking customer PII to a competing VASP, thereby creating an opportunity for a competing VASP to acquire the clients of the VASP which shared the client PII.

Since the FATF guidelines require an exchange of information between parties (i.e., verification of both parties involved in the transaction), each party is dependent not only on its own capabilities but also proper behavior of all other ecosystem participants. In many cases, information exchange occurs in connection with transactions over a decentralized network, such as a blockchain, where there is not always a legal relationship or other trust relationship between the parties. In decentralized networks, parties participate in transactions through the above-noted wallets. Process flow in a decentralized network can be controlled by "smart contracts", i.e., executable code stored in a decentralized environment. In many instances, the personal identity of the party associated with the wallet is not readily ascertainable. Thus, there is a need for a system capable of ensuring mutual data exchange between VASPs that secures the data communicated between the two parties. Prior art fails to provide an efficient mechanism for assuring the above-noted mutual and secure data exchange.

The present invention overcomes the limitations noted above with respect to secured mutual data exchange by providing a technical mechanism for secure, trustless data exchange through the minting and use of a data access tokens in a platform that ensures all participating parties, such as VASPs, that sensitive data is available when necessary, and only when necessary. The present invention is designed such that VASPs, or other parties, that do not have a relationship with, and therefore no inherent mutual trust, have a secure way to protect their most valuable asset (their customer data) and only give out information when required, and when assured they will receive the counterparty's information.

Practical governance in a global confederated ecosystem of VASPs requires a layered certification process: a process for verifying verifiers, verifying VASPs, and verifying VASP customers, e.g., transacting parties. The present invention permits the verification of "unhosted" wallets, i.e., wallets that are not controlled by a VASP. The prior art fails to incorporate verification of unhosted wallets, thus unhosted wallets have not previously been able to participate in Travel Rule compliant transactions. Specifically, the Travel Rule requires information regarding the beneficiary and the originator of the transaction, which unhosted wallets are unable to verify and provide. This has become very important as the Travel Rule guidelines have been implemented by several jurisdictions (e.g., Netherlands, Switzerland, the Financial Crimes Enforcement Network (FINCEN) in the US) to apply to unhosted wallets. The present invention advantageously implements a layered certification process to register unhosted wallets while not requiring the wallet holder to give up their private key, thus keeping personally identifiable information off-line and re-usable, thereby increasing privacy and data protection in computer network communications.

Coupled to the verification/certification process, is the assured delivery of data associated with a qualifying transaction. The disclosed implementations can include an "on-chain" token registry and an "off-chain" data host, as well as other distributed components, as described in detail herein.

In one embodiment, the present invention includes retrieving, interpreting, and enforcing an access policy, where the policy may include rules regarding the qualifying attributes of a transaction, sending party, receiving party, or other context. In one embodiment, policy access, interpretation, and enforcement are carried out according to a policy engine, such as that described in U.S. Pat. No. 11,410,235, which is incorporated herein by reference in its entirety.

While embodiments of the invention disclosed herein are discussed in the context of digital asset transactions through a network of VASPs, one of ordinary skill in the art will appreciate that the present mutual data exchange and verification system is applicable to any parties or situation in which there is a need for mutually assured secure data exchange. The terms "party" and "parties" as used herein refer to computing platforms and/or devices associated with participating entities, as well as the entities, individually and collectively as indicated by context of the use. As noted above, the FATF guidelines require an exchange of information between parties, wherein each party is dependent not only on its own capabilities but also on proper behavior of other ecosystem participants. Additionally, the terms "client" and/or "customer" as used herein refer to the entity using the services provided by a VASP.

The present invention includes two technical innovations for supporting a compliance framework for a global ecosystem of parties, such as VASPs, who are subject to the oversight of different regulators. First, a layered or confederated governance framework by which a regulatory certification entity (e.g., Securities and Exchange Commission (SEC), Commodity Futures Trading Commission (CFTC), FATF) certifies the VASP certification entities responsible for certifying a client's identity. This ensures all participating parties meet the requirements for data exchange. And second, a data exchange architecture, model, and process that ensures required data is securely stored prior to transaction authorization and released for access only after a qualifying transaction occurs.

Referring now to the drawings in general, the illustrations are for the purpose of describing one or more preferred embodiments of the invention and are not intended to limit the invention thereto.

FIG. 1 illustrates an architecture and method for certification of parties and conducting secured information exchange according to one embodiment of the present invention. This example relates to transactions by VASPs on behalf of other parties, such as customers of the VASPs. Architecture 100 is executed on a computing platform according to one embodiment of the present invention. The architecture 100 includes common data store 110 wherein a VASP acting as a Certification Agent is given the right to write KYC status and other attributes associated with a public blockchain address in the context of an unhosted wallet, e.g., KYC on party X that is not the VASP's customer and where party X at all times retains control over its wallet and does not share its private key. Common data store 110 includes compliance oracle 112, regulatory compliance dashboard 114, and identity information exchange (HEX) 116.

In one embodiment, the certification of hosted wallets is part of a larger verification process used with a transaction process for Travel Rule compliance or other secured mutual data exchange, which is described in detail herein. In one embodiment, the certification of hosted wallets is not used with a transaction process for Travel Rule compliance. At step 120, a certifier and their authorized personnel are registered, who in turn will certify the VASPs. In one embodiment, a regulatory certification entity (e.g., an official registrar such as the SEC or an appointed Self-Regulatory Organization) administers this step. In one embodiment, this chain of authority is rooted. In one embodiment, this chain of authority is revocable. In one embodiment, this chain of authority is not revocable. In one embodiment, additional regulatory certification entities and certification steps are operable to be included in the certification of the VASP certification entities. In one embodiment, this chain of certified authority is applied to the attestation of any right governed by a confederation of parties.

At step 122, VASPs and their authorized personnel are registered by the certifier, the authorized personnel of the certifier, and/or a regulatory entity. In one embodiment, the VASP is listed in an official registrar of the regulatory entity upon certification. In one embodiment, certified certifiers of the VASP are listed in an official registrar of the regulatory entity upon certification. This ensures that the certifier is a known and verified user who is authorized by a representative of the VASP with the authority to speak on behalf of the VASP for performing actions in name of the VASP. Representatives of the VASP provide KYC documentation on both themselves and their employer—the VASP legal entity. A VASP official registrar approves the KYC of the natural person and VASP legal entity details as valid.

The certification information provided in steps 120, 122, and 124, and related supporting documents are saved in encrypted form in HEX 116. Attestation regarding compliant VASP status is created and saved as updated information to the open, decentralized HEX 116. In one embodiment, HEX 116 and other portions of data store 110 are a distributed ledger such as a blockchain. In one embodiment, this information is stored in the distributed ledger component described below with respect to FIG. 2.

Once the VASP has been approved, the service provider is operable to configure entity structure, including subsidiary entities, departments, and individuals who will be performing functions and who will have access to financial functions, certification accounts and functions, and other business functions. This approach to the certification process allows VASPs to protect client data. This approach is further advantageous because it does not require a VASP to custody non-client PII data. Furthermore, it imposes a uniform set of regulatory certification requirements over a decentralized certification network (e.g., SRO or inter-VASP trust network). In one embodiment, a certified VASP is operable to verify that an uncertified VASP is Travel Rule compliant via an application programming interface (API) and/or on-chain when the framework is extended to third parties, for instance VASPs in an overseas trust network. In one embodiment, a certified VASP is operable to verify an uncertified VASP automatically. In one embodiment, the certified VASP is not operable to verify an uncertified VASP automatically. In one embodiment, a certified VASP is operable to verify an uncertified VASP manually. In one embodiment, the certification of one or more parties to create a certified VASP is accomplished via a rights management system such as that disclosed in US Patent Pub No. 2021/0390191, incorporated herein by reference in its entirety.

One of ordinary skill in the art will appreciate that the mechanism by which parties are granted verification rights provides a network of trusted parties. This network is created using a rights management system such as that disclosed in US Patent Pub No. 2021/0390191. The rights management system establishes a means by which an authority structure is operable to be formed from an open group of blockchain participants. In one embodiment, the authorizing authority (i.e., the system operator and/or the regulators who authorize the right) assigns the right by signing a blockchain transaction, which in turn signs a transactions that certifies the identity data linked to wallets.

In one embodiment, the verification of an identity under the authority of a VASP is automated. In one embodiment, the verification of an identity under the authority of a VASP is semi-automated and requires the attestation to be attributable to an entity. In one embodiment, the configuration of the automated and/or semi-automated process is the responsibility of a trusted entity (e.g., agent or VASP). In one embodiment, if the automated and/or semi-automated process verifies an identity incorrectly, a trusted entity associated with the verification is responsible and is removed from the trust network. One of ordinary skill in the art will appreciate that this is an important aspect of regulatory expectations for verification and risk management, as each entity is accountable for attestations made to the trust network.

At step 124, the certified VASPs certify the wallet and/or wallets of a customer. In one embodiment, this is accomplished by the authorized personnel at the VASPs. The personnel registers the account and wallet information of the customer on the system. In one embodiment, this is accomplished by linking blockchain wallet addresses to Personally Identifiable Information (PII), and other attributes such as Know Your Customer (KYC) status. In one embodiment, step 124 includes the user providing KYC documentation via an associated VASP portal. In one embodiment, step 124 includes the authorized VASP compliance officer approving KYC details as valid. In one embodiment, step 124 includes the creation of attestation information and updating and attestation registry of compliance oracle 112. In one embodiment, attestation data includes but is not limited to KYC status, certification status and certification type.

In one embodiment, the attestation registry of the present invention is a smart contract based general purpose data management layer such as that disclosed in US Patent Pub. No. 2022/0271936, incorporated herein by reference in its entirety. In one embodiment, the attestation registry of the present invention is a smart contract based general purpose data management layer such as that disclosed in US Patent Pub. No. 2022/0271936, with the exception that client PII and other privacy data, including travel rule data, is viewable only by authorized parties upon completion of a qualifying transaction according to one embodiment of the present invention.

This advantageously enables any VASP in the network of trusted and/or certified VASPs to verify that the wallet (i.e., public address) of the client has been attested by the VASP as a wallet associated with a known and verified user (i.e., KYC status has been verified) and the PII details are then operable to be retrieved per regulatory requirements when a qualifying transaction occurs. In a global extension of this framework, compliance oracle 112 is hosted on a blockchain or other distributed ledger and the compliant status (not the PII) is broadcast for smart contract use, global wallet discovery and integration into third-party Travel Rule solutions, as described with respect to FIG. 2 below.

In one embodiment, the VASP registers the wallet of a non-customer by linking blockchain wallet addresses to Personally Identifiable Information (PII) and/or other attributes such as Know Your Customer (KYC) status. In one embodiment, this process includes KYC/PII documentation provided by an account associated with the non-customer wallet via a VASP portal. In one embodiment, this process includes the approval of the KYC details as valid by the VASP. In one embodiment, the control over the non-customer wallet is verified (e.g., by signing a blockchain transaction or transferring a fraction of a virtual asset). In one embodiment, the VASP creates attestation information associated with the non-customer wallet and updates the attestation of compliance oracle 112 with the new attestation information. In this way, a VASP in the network is operable to verify that the wallet (i.e., public address) associated with a user has been attested as a verified (i.e., "KYC'd") party by the certification agent and the PII details are available for retrieval per regulatory requirements when a qualifying transaction occurs. In one embodiment, in a global extension of this framework, the Compliance Oracle 112 is a hosted blockchain or other distributed ledger and the compliant status (not the PII) is broadcast for smart contract use, global wallet discovery and integration into third-party Travel Rule solutions.

The registration/certification process is advantageously operable to be leveraged to ensure secure mutual exchange of data for financial transactions or other applications. In one embodiment, the transaction process and data access process are only operable once the VASP and/or the wallet is certified. In one embodiment, the transaction process and data access process occur simultaneously with the certification process. The transaction process takes place when a party, such as a VASP or VASP customer, initiates a transaction of a digital asset at step 126. The system recognizes the certification status of the customer wallets and the VASPs involved in the transaction. In one embodiment, the identification of an uncertified VASP and/or wallets would automatically prohibit any transaction. In one embodiment the identification of an uncertified VASP and/or wallet that has been verified does not automatically prohibit a transaction. Prior to the execution of a transaction, the customer wallet policy is evaluated for eligibility at step 128 to ensure compliance or policy requirements. This compliance procedure utilizes a policy engine, such as that described in U.S. Pat. No. 11,410,235 which is incorporated herein by reference in its entirety.

At step 130, the transaction is executed, under control of the policy engine, and at step 132, data is exchanged in a secure manner. In one embodiment, the data is in the form of IVMS101 data packets. One of ordinary skill in the art will appreciate that an IVMS101 data package is an industry-adopted data standard that contains all the necessary information for compliant Travel Rule transactions. However, the system of the present invention is advantageously operable with data packages that are not an IVMS101 data package.

Regulatory compliance dashboard 114 displays, in a configurable format, all the operations related to transactions and the Travel Rule data on source and beneficiary VASPs and VASP customers based on information stored in HEX 116. This will include relevant PII data, entity data, and all transaction details. Disclosed implementations are applicable in, among other scenarios, the instance of hosted wallets, unhosted wallets, unregistered wallets, and custody wallets.

Hosted wallets: A verified wallet of licensed VASP making a cryptocurrency transfer to a verified wallet of another licensed VASP.

Unhosted Wallets: Two verified wallets making a cryptocurrency peer-to-peer (P2P) transaction using an open-source unhosted wallet (e.g., Metamask).

Unregistered Wallet: A hosted wallet initiating transfer of cryptocurrency to an unknown address (not known if hosted or unhosted).

Custody Wallets Transfer: A licensed VASP making an internal transfer between two custody wallets.

Each transaction appears in the reporting with all relevant details enabling the regulator to exercise real-time supervision of digital assets in their jurisdiction. The Identity Information Exchange (HEX) is the platform that regulates how, when and under which conditions data is exchanged as described in herein. While the invention is explained in terms of an exchange of a digital asset, the present system if applicable for a variety of data exchanges and transactions.

There are significant technical challenges that must be addressed in order to accomplish the functions noted above. These challenges result from at least three pragmatic considerations: (1) parties, such as VASPs, don't want to give up customer information without need; (2) parties, such as VASPs, must have a secure mechanism to provide such information when there is such as need, such as a qualifying digital asset transaction; and (3) parties, such as VASPs, must have assurance that counterparties will provide corresponding information required for internal diligence and regulatory reporting.

Some prior art systems attempt to address this problem. However, these prior art systems utilize a centralized data exchange model. This centralized model is expensive, and the data transfer on the centralized model requires a significant amount of time to process. Further, these prior art systems represent only one trust level (e.g., international bank transactions) when there is a need for many trust networks including transactions of private securities. Further still, the centralized model exposes significant privacy challenges in the exchange of data as elaborated upon herein. The present invention is operable to establish a multi-level network for various value exchanges without the need for a centralized data exchange network utilized by the prior art.

Figure 2:
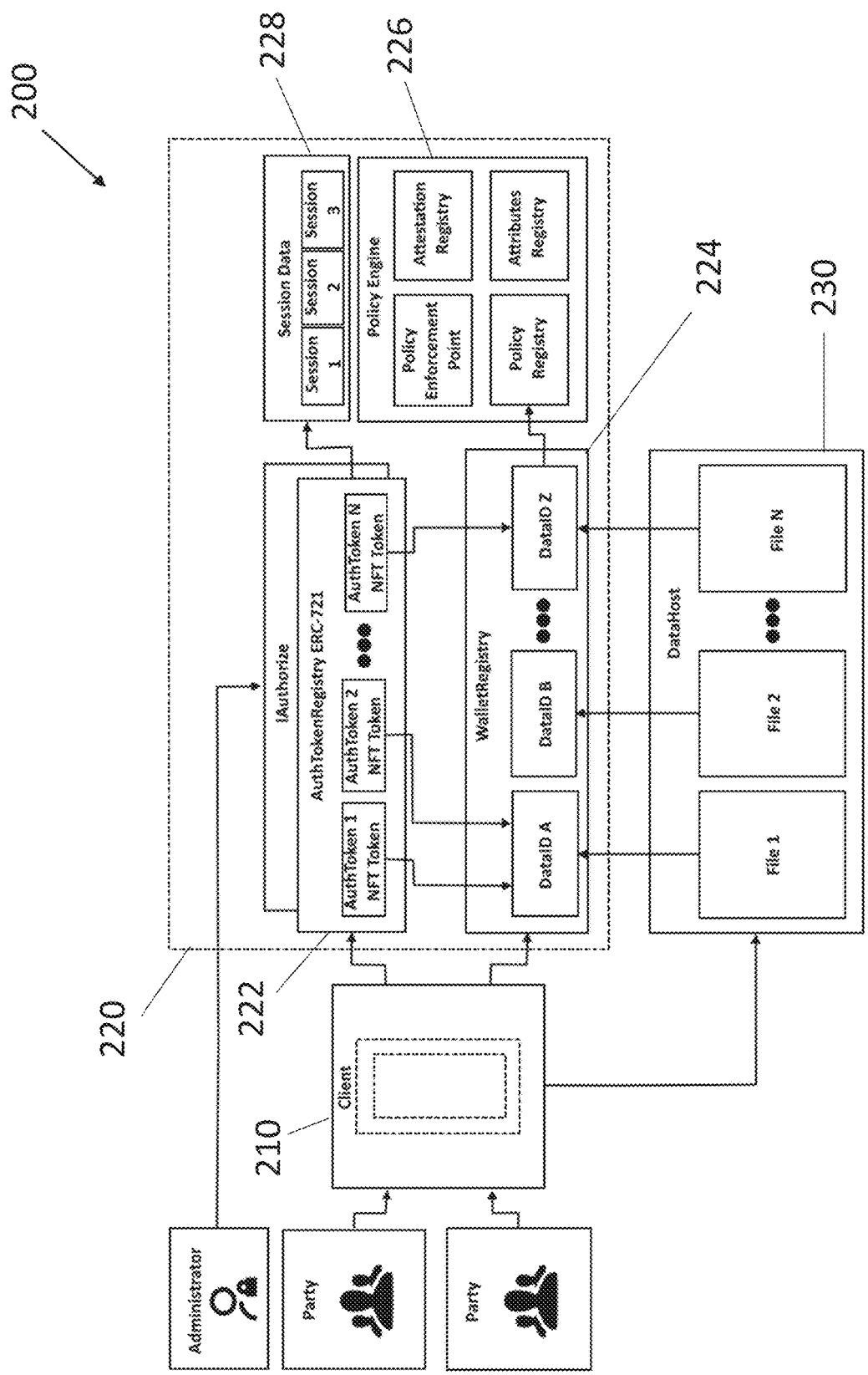
FIG. 2 is a schematic diagram of a distributed computing system according to one embodiment of the present invention.

FIG. 2 illustrates a distributed networked computing system 200 according to one embodiment of the present invention. System 200 addresses the above-noted technical issues through a distributed computing system including client interface computing platform 210 (also referred to as "client 210"), off-chain data host 230, and on-chain distributed ledger platform 220. The system 200 provides registration of wallets and secure, assured transfer of access rights to client data when a qualifying transaction occurs. Distributed ledger platform 220 is a decentralized infrastructure such as an Ethereum blockchain or other distributed ledger technology. Distributed ledger platform 220 includes authorization token registry 222 ("AuthTokenRegistry") and Wallet Registration Smart Contract(s) 224 ("WalletRegistry"). In one embodiment, the present invention uses an extended ERC-721 token for the on-chain representation of the authorization tokens ("AuthToken"). In one embodiment, the present invention uses an Ethereum token for the on-chain representation of the authorization tokens, including but not limited to an ERC-20 token, an ERC-777 token, an ERC-1155 token, an ERC-223 token, an ERC-827 token, an ERC-1337, and an ERC-4626 token. The session registry 228 store session data on the distributed ledger platform 220. Policy engine 226 of distributed ledger platform 220 ensures regulatory compliance for any transactions and includes a policy enforcement point (PEP), a policy registry, an attestation registry, and an attributes registry.

Data host 230 is preferably implemented as off-chain data storage for storing encrypted PII data or other sensitive data which cannot be decrypted by the data host 230. In one embodiment, the data host stores data on the blockchain. In one embodiment, the encrypted data is hosted using a variety of data storage techniques, including but not limited to on-premises storage, cloud storage, and decentralized storage systems (e.g., InterPlanetary File System (IPFS)). The IPFS is a decentralized storage solution for blockchain-based content. When using IPFS, files are divided into parts and stored across a network of nodes that track the file by hashes. The parts are assembled based on their hash value to recreate the original file. In the examples herein, clusters of data are referred to as "files". However, the term files as used herein "files" refers to one or more packets or clusters of data. The "files" need not be stored as a single file or group of files in the conventional sense of the word. In a preferred embodiment, the data host has no access to the unencrypted data.

Client 210 and data host 230 are implemented using a range of hardware, software programming and architecture techniques. In one embodiment, the present invention implements a modern programming language for the client interface and data host including but not limited to C++, Java, node.js, Flutter, and React. In one embodiment, the data host uses asymmetric encryption while the client interface uses both symmetric and asymmetric encryption. In one embodiment, the client interface uses only asymmetric encryption. In one embodiment, the client interface uses only symmetric encryption. In one embodiment, two encryption layers are used to prevent unauthorized access of data. The first layer protects the document from access by data host 230 or any other unauthorized party. The second layer enables the transfer of access rights to authorized recipients within a session established on distributed ledger platform 220.

The distributed ledger platform 220 depicted in FIG. 2 is the same distributed ledger platform 220 depicted in FIGS. 3-8. The authorization token registry 222 ("AuthTokenRegistry"), Wallet Registration Smart Contract(s) 224 ("WalletRegistry"), policy engine 226, and session registry 228, depicted in FIG. 2, while not specifically depicted in FIGS. 3-8, are components of the distributed ledger platform 220 and the functionality of such components should be understood as part of the distributed ledger platform 220 as referred to herein, including in FIGS. 3-8.

Figure 3:
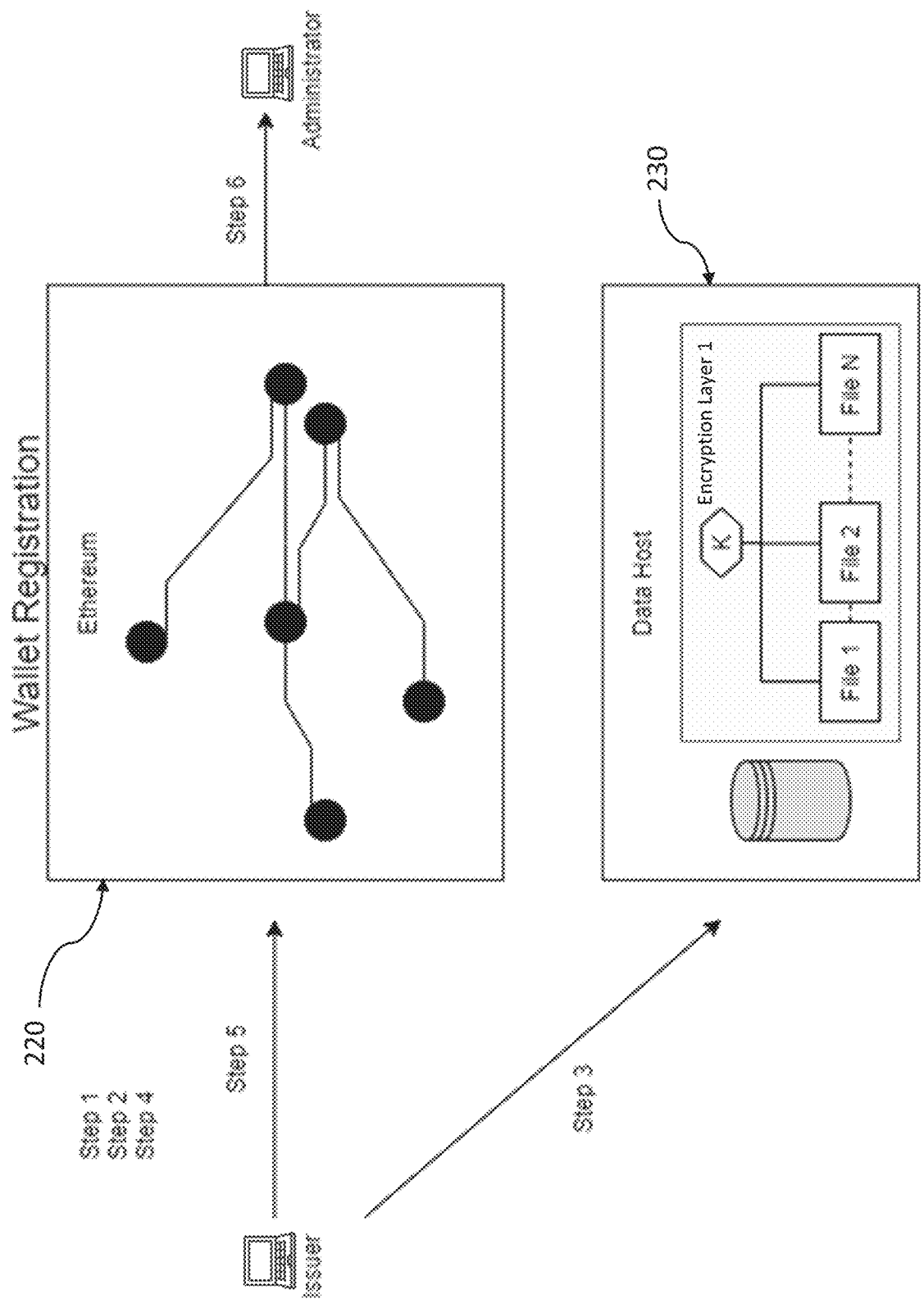
FIG. 3 is a schematic illustration of a wallet registration workflow according to one embodiment of the present invention.

FIG. 3 illustrates the process for registering verified wallets according to one embodiment of the present invention. The wallet is operable to be either an on-chain or off-chain address. To register a wallet, a VASP that is a certified party with PII data to share on the owner of a wallet creates a key K for encryption using a key generation techniques, at step 1. The VASP retains K. At step 2, the VASP then encrypts, using a symmetric encryption algorithm, the PII data using key K. At step 3, the VASP then sends the encrypted data, using client 210, to data host 230 and data host 230 generates an internal ID "DataID" that is used to identify and retrieve the encrypted PII data in the system. At step 4, the VASP encrypts key K, using an asymmetric encryption algorithm, with the public key of the administrator (e.g., a regulator) wallet resulting in an access key "AccessKey" for the administrator wallet. As a result, only the party who holds the private key for the public address may decrypt the contents—therefore, only the desired recipient of the PII may decrypt the PII data. In one embodiment, the sender is not required to have the private key in order to encrypt the contents. In one embodiment, the sender is required to have the private key in order to encrypt the contents. At step 5, the VASP signs a register request to the blockchain authorization token registry 222 (depicted in FIG. 2) of the data host 230 to issue one or more AuthToken(s), by means of a smart contract of the distributed ledger platform 220, for an administrator (for example a regulatory agency) who will have access to the data. At step 6, the issued AuthToken is sent to a wallet corresponding to an administrator. In one embodiment, the AuthToken is a non-fungible token (NFT) expressed as a data structure that contains (at least):
AuthTokenID (a unique token identifier)
AccessKey (generated in step 4 above)
DataID (generated in step 3 above)
PolicyID (for identifying a policy to be applied/enforced by policy engine 226)
Source or Owner of data (i.e., VASP wallet)
Client Wallet Address or other account identifier In one embodiment, DataID is a pointer. In one embodiment, DataID is a hash pointer. One of ordinary skill in the art will appreciate that a pointer stores the memory address of a specific set of data, while a hash pointer is a pointer that further stores a cryptographic hash in addition to stores the memory address of a specific set of data. The use of a cryptographic hash pointer is advantageous in creating a tamper-proof data set, as edits made to the data set indicated by the hash will alter the hash of the data set. The hash included in the hash pointer therefore no longer matches the hash of the data set and prevents accessing the data set.

One of ordinary skill in the art will appreciate that known key generation techniques create a key for encrypting and decrypting data to secure the information included within the data. Known key generation techniques include but are not limited to DSA, RSA, Diffie-Hellman, ECDSA, ECDH, DES, RC4, 3DES, AES, and ChaCha20. Further, one of ordinary skill in the art will appreciate that any process herein using symmetric encryption methods is operable to be configured to use asymmetric encryption methods in order to increase the security of the system of the present invention. Likewise, any process herein using asymmetric encryption methods is operable to be configured to use symmetric encryption methods to decrease the processing power required by the system of the present invention.

Figure 4:
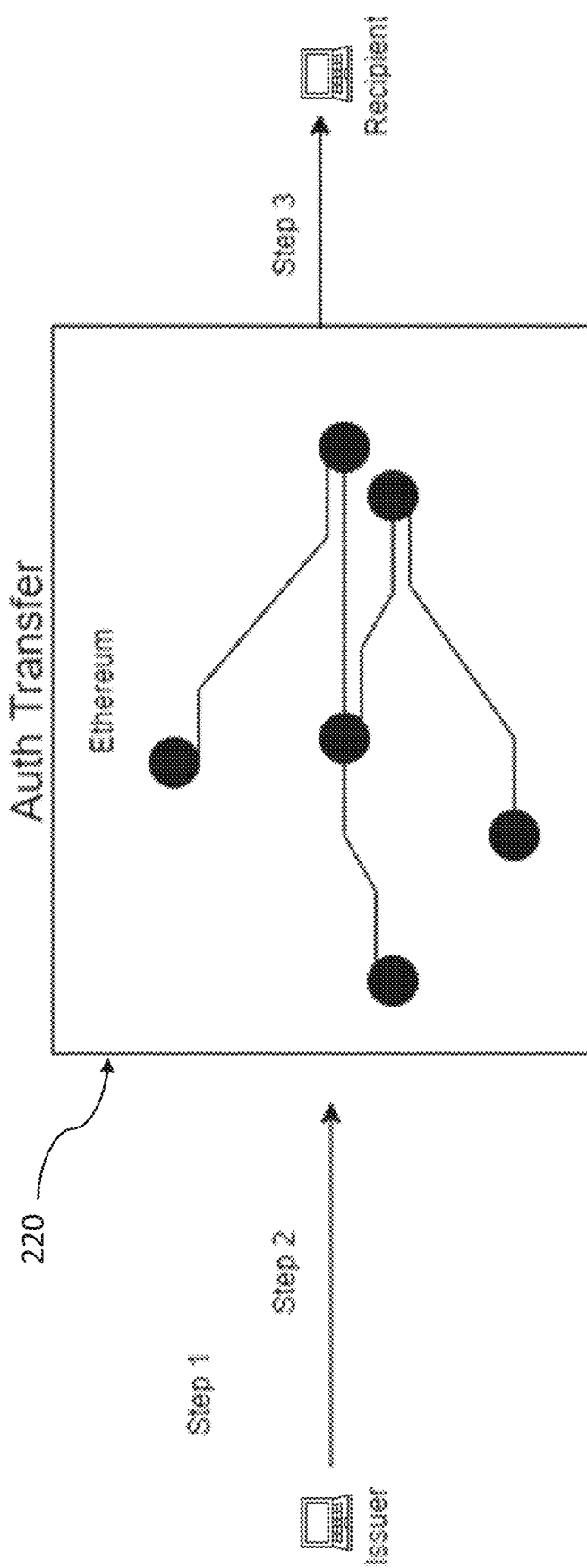
FIG. 4 is a schematic illustration of an information rights authorization transfer workflow according to one embodiment of the present invention.

FIG. 4 illustrates the process of providing data access rights to a counterparty and/or regulator according to one embodiment of the present invention. In one embodiment, each party involved in a multilateral exchange of data implements the process of FIG. 4 to provide data access to the other party or multiple parties. At step 1, a first party (e.g., an issuing VASP) asymmetrically encrypts key K using the public key of one or more wallets of a second party, such as a recipient VASP, thereby creating an AccessKey for each wallet that will receive authorization to access the data. At step 2, the issuing VASP signs and authorizes a request to the distributed ledger platform 220 to deploy a smart contract issuing one or more AuthTokens for the recipient VASP(s) who will have access to the data when a qualifying transaction occurs. In one embodiment, the source of the AuthToken data structure indicates the wallet of the issuer party, such as a VASP. At step 3, AuthTokens are sent to wallets of recipient parties, such as counterparty VASPs and/or regulators.

Figure 5:
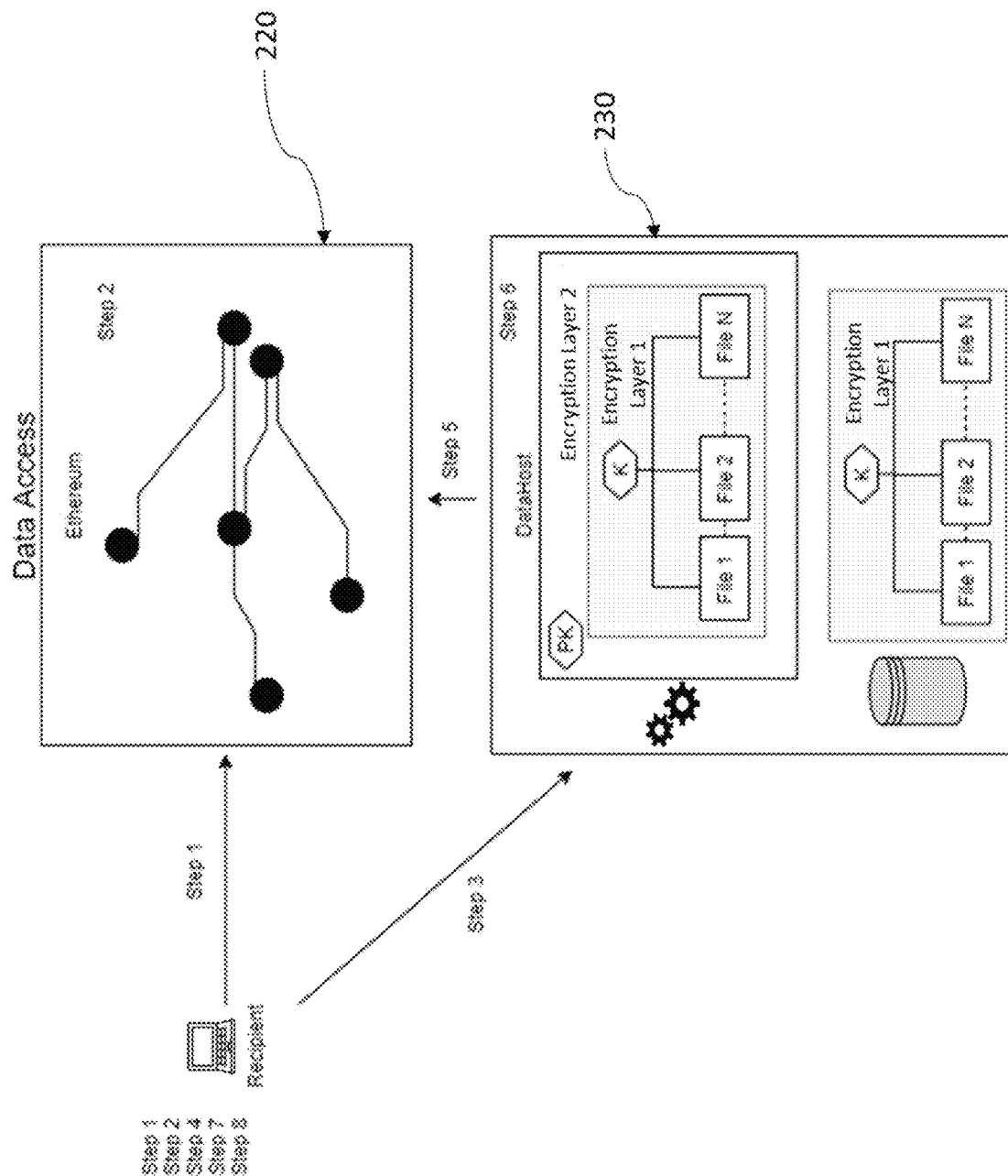
FIG. 5 is a schematic illustration of a data access workflow according to one embodiment of the present invention.

FIG. 5 illustrates the steps for the receiving party, such as a recipient VASP(s), to gain access to encrypted data, such as encrypted PII data relating to a digital asset transaction, based on the rights granted according to one embodiment of the present invention. In one embodiment, each party involved in a multilateral implements the process of FIG. 5 to provide data access to the other party or multiple parties. At step 1, the certified Recipient VASP sends an access request message including the AuthTokenID to distributed ledger platform 220 to open an authorization session for the requested data. At step 2, a smart contract on distributed ledger platform 220 checks whether the Recipient VASP is an AuthToken holder for the requested data. In one embodiment, the smart contract checks if the Recipient VASP has been granted access rights consistent with both the authorization request and the policy engine and has supported a qualifying transaction for the client wallet. If yes, a SessionID is generated. The SessionID is stored on-chain in a session registry (i.e., session registry 228 of FIG. 2). The SessionID contains AuthTokenID for the corresponding AuthToken, expiration data (e.g., time to live (TTL)), and rights data. At step 3, the recipient VASP sends a request message containing the SessionID to data host 230. At step 4, data host 230 sends a request message containing the SessionID to on-chain distributed ledger platform 220 to obtain DataID and TTL data and the public key PK of an account associated with the authorization request. During this step, the Wallet Registry smart contract consults the policy engine to determine if a qualifying transaction has occurred or other conditions have been met prior to sending a response containing the encrypted data.

At step 5, data host 230 retrieves the corresponding encrypted files using the DataID and encrypts the files again using the public key PK of the wallet requesting access (this effects encryption layer 2 noted above). At step 6, the recipient VASP decrypts the data using its wallet's private key resulting in data packet with encryption layer 1 noted above (i.e., data encrypted with key K). At step 7, the recipient VASP decrypts AuthTokenID using its private key yielding encryption key K and, at step 8, the recipient VASP decrypts data using key K to thereby gain access to the data.

Figure 6:
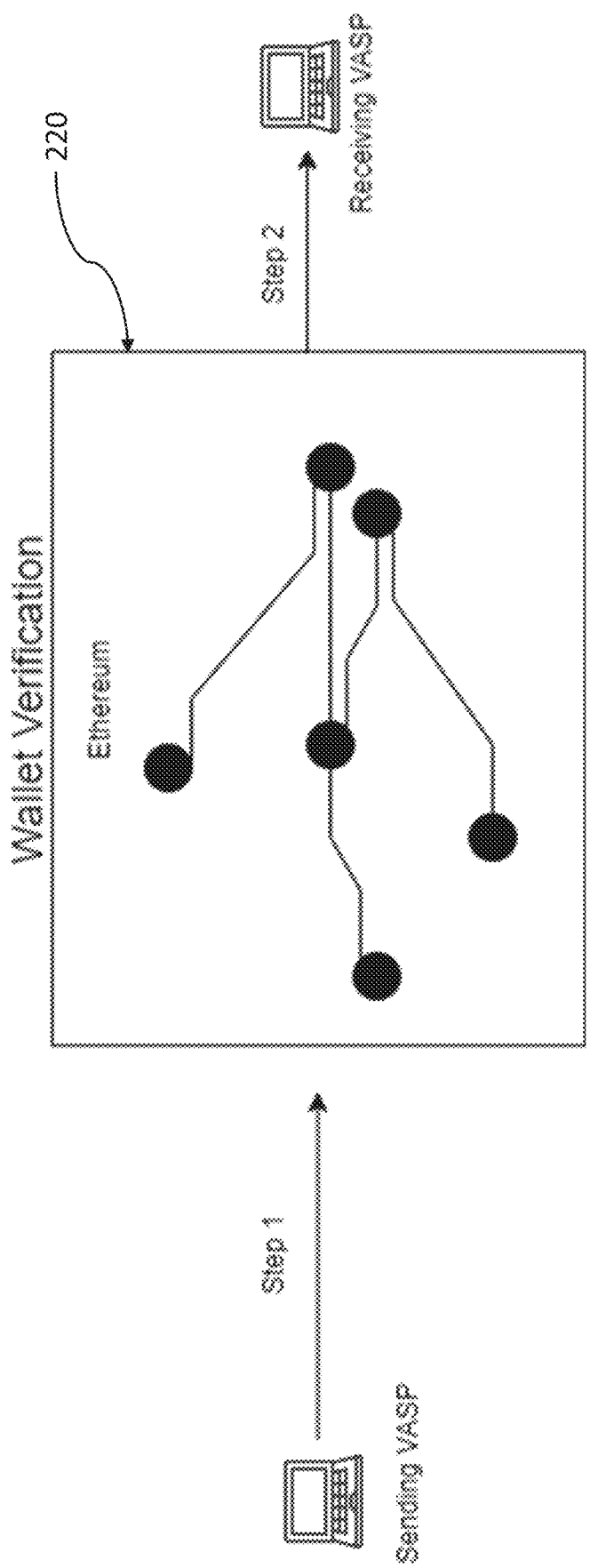
FIG. 6 illustrates a schematic illustration of wallet verification workflow according to one embodiment of the present invention.

FIG. 6 illustrates the steps for wallet verification according to one embodiment of the present invention. Prior to enabling a transfer to a third-partythird-party wallet, the sending VASP verifies the presence of an AuthToken for the counterparty wallet in step 1. Prior to enabling receipt of a transfer from a third-party wallet, the receiving VASP verifies the source address has been verified by a certified VASP by checking the wallet registry of the distributed ledger platform 220 in step 2. In one embodiment, the token being transferred has internal logic as part of the smart contract transfer function that checks the wallet registry for registration of the sending and receiving wallet prior to allowing transfer.

The workflows above describe the use of a data access token in the process of a secure, conditional exchange of information where multiple parties are assured that the data is both properly used and is available upon meeting the conditions. The originating party has certainty in advance of a transaction that if a transaction is allowed, the appropriate information will be made available to specified parties, regardless of the desire of the beneficiary to retain information. And vice versa, the beneficiary and/or other appropriate parties are guaranteed access to information about the sender. The novel combination of data structures, on-chain and off-chain registries, key management and secure message flows allow the parties to be assured of secure mutual data exchange. In one embodiment, the system of the present invention only uses the initial transfer of Authorization to the Administrator (Regulator) wallet. If AuthTokens are not sent to counterparty VASPs, only the regulator is able to see qualifying transactions and VASPs would not share the PII data with other (competing) VASPs. Using the system of the present invention, a reporting service is operable to limit distribution of PII data to regulators required and authorized to view the data. In one embodiment, the present invention includes one or more of the rights transfer processes and data access processes disclosed herein.

Figure 7:
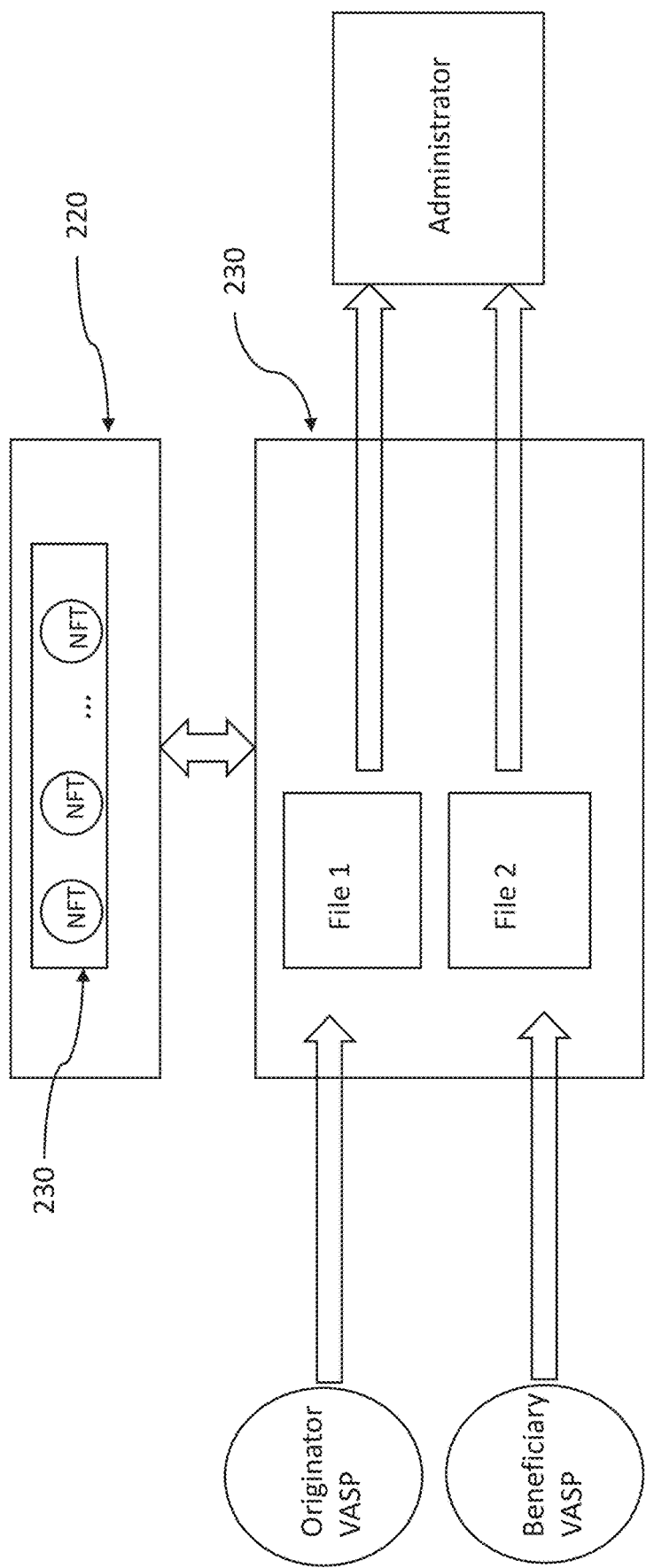
FIG. 7 illustrates a flow of permission rights to data according to one embodiment of the present invention.

FIG. 7 illustrates the process of exchanging data according to one embodiment of the present invention. Information, in the form of file 1, is transmitted to a data store of the data host 230 by an Originator VASP and information, in the form of file 2, is transmitted to the data store of the data host 230 by a Recipient VASP. Upon a completed transaction, such as transfer of a digital asset, the information is made available to an administrator, such as a regulatory agency, in accordance with rights represented by NFTs minted by distributed ledger platform 220.

Figure 8:
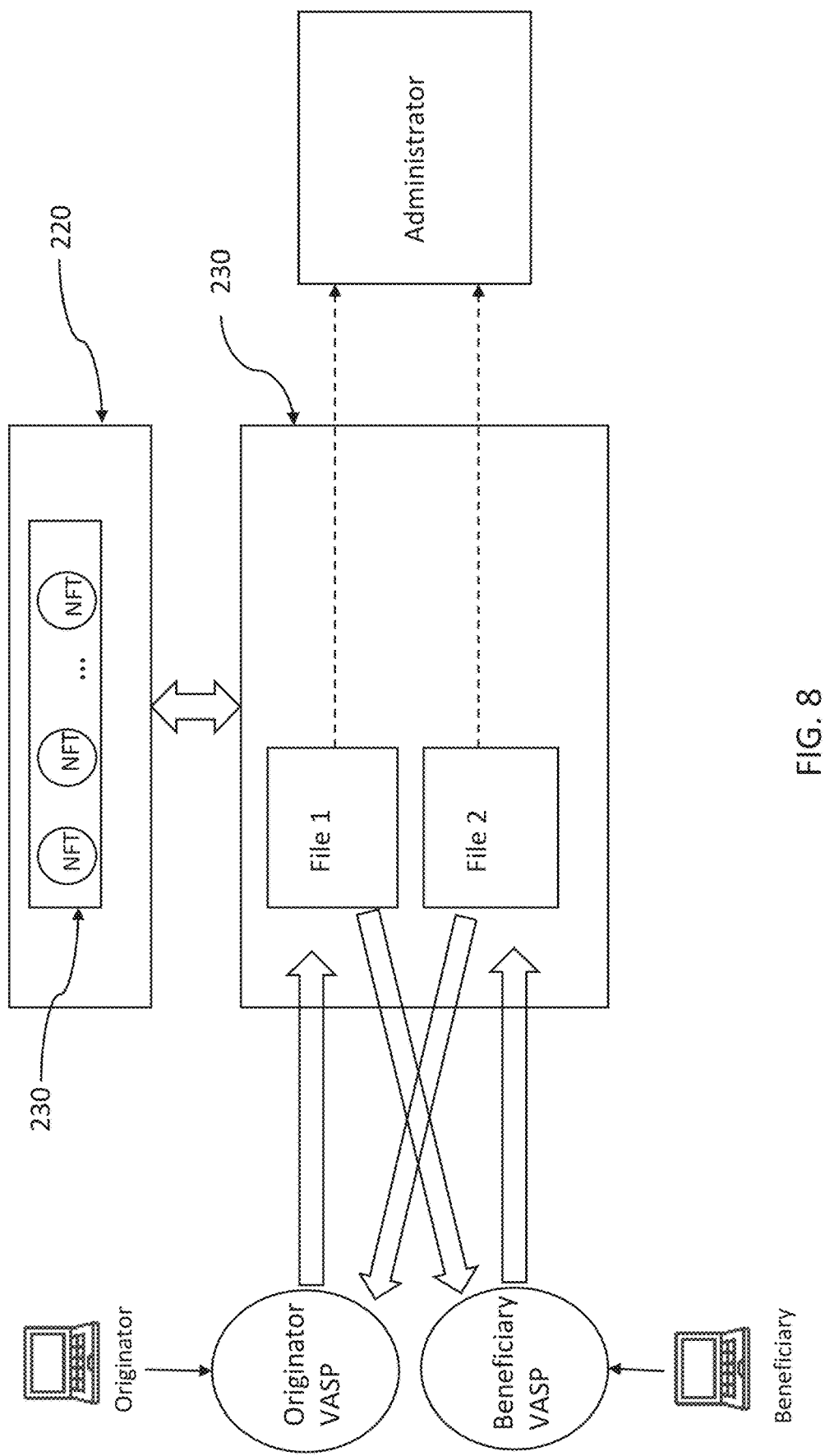
FIG. 8 illustrates a flow of permission rights to data in which transaction parties receive counterparty information according to one embodiment of the present invention.

FIG. 8 illustrates the process of exchanging data according to one embodiment of the present invention. Information in the form of file 1, is transmitted to data host 230 by an Originator VASP and information, in the form of file 2, is transmitted to data host 230 by a Recipient VASP. Upon a completed transaction, such as transfer of a digital asset, the information is made available to the counterparty VASP in accordance with rights represented by NFTs minted by distributed ledger platform 220. The information of FIG. 8 can also be made available to an administrator as described in FIG. 7.

Figure 9:
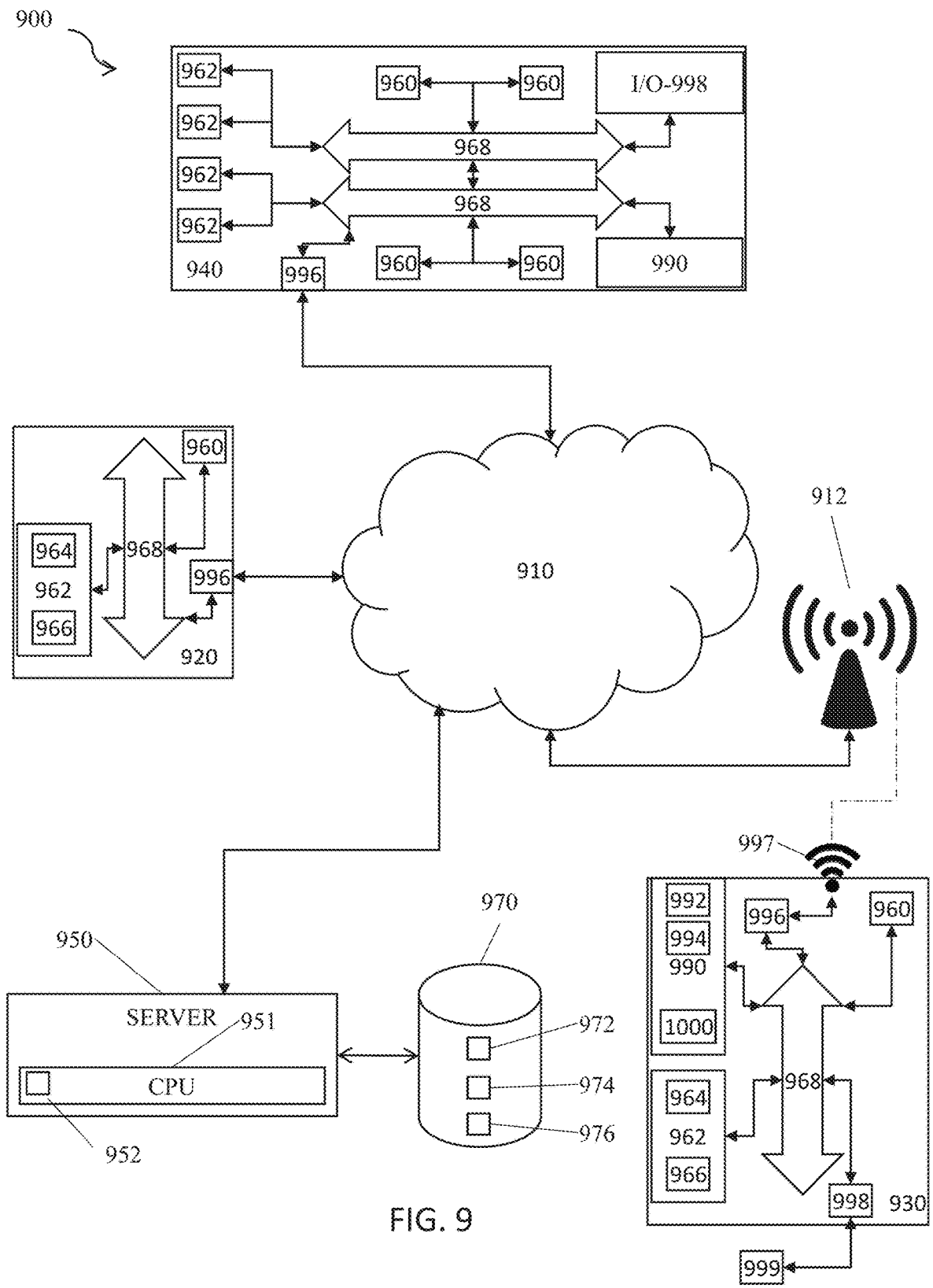
FIG. 9 is a schematic diagram of a system of the present invention.

FIG. 9 is a schematic diagram of an embodiment of the invention illustrating a computer system, generally described as 900, having a network 910, a plurality of computing devices 920, 930, 940, a server 950, and a database 970.

The server 950 is constructed, configured, and coupled to enable communication over a network 910 with a plurality of computing devices 920, 930, 940. The server 950 includes a processing unit 951 with an operating system 952. The operating system 952 enables the server 950 to communicate through network 910 with the remote, distributed user devices. Database 970 is operable to house an operating system 972, memory 974, and programs 976.

In one embodiment of the invention, the system 900 includes a network 910 for distributed communication via a wireless communication antenna 912 and processing by at least one mobile communication computing device 930. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 900 is a virtualized computing system capable of executing any or all aspects of software and/or application components presented herein on the computing devices 920, 930, 940. In certain aspects, the computer system 900 is operable to be implemented using hardware or a combination of software and hardware, either in a dedicated computing device, or integrated into another entity, or distributed across multiple entities or computing devices.

By way of example, and not limitation, the computing devices 920, 930, 940 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 920 includes components such as a processor 960, a system memory 962 having a random access memory (RAM) 964 and a read-only memory (ROM) 966, and a system bus 968 that couples the memory 962 to the processor 960. In another embodiment, the computing device 930 is operable to additionally include components such as a storage device 990 for storing the operating system 992 and one or more application programs 994, a network interface unit 996, and/or an input/output controller 998. Each of the components is operable to be coupled to each other through at least one bus 968. The input/output controller 998 is operable to receive and process input from, or provide output to, a number of other devices 999, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 960 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 940 in FIG. 9, multiple processors 960 and/or multiple buses 968 are operable to be used, as appropriate, along with multiple memories 962 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 900 is operable to operate in a networked environment using logical connections to local and/or remote computing devices 920, 930, 940 through a network 910. A computing device 930 is operable to connect to a network 910 through a network interface unit 996 connected to a bus 968. Computing devices are operable to communicate communication media through wired networks, direct-wired connections or wirelessly, such as acoustic, RF, or infrared, through an antenna 997 in communication with the network antenna 912 and the network interface unit 996, which are operable to include digital signal processing circuitry when necessary. The network interface unit 996 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 962, the processor 960, and/or the storage media 990 and is operable be a single medium or multiple media (e.g., a centralized or distributed computer system) that store the one or more sets of instructions 1000. Non-transitory computer readable media includes all computer readable media, with the sole exception being a transitory, propagating signal per se. The instructions 1000 are further operable to be transmitted or received over the network 910 via the network interface unit 996 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 990 and memory 962 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 900.

In one embodiment, the computer system 900 is within a cloud-based network. In one embodiment, the server 950 is a designated physical server for distributed computing devices 920, 930, and 940. In one embodiment, the server 950 is a cloud-based server platform. In one embodiment, the cloud-based server platform hosts serverless functions for distributed computing devices 920, 930, and 940.

In another embodiment, the computer system 900 is within an edge computing network. The server 950 is an edge server, and the database 970 is an edge database. The edge server 950 and the edge database 970 are part of an edge computing platform. In one embodiment, the edge server 950 and the edge database 970 are designated to distributed computing devices 920, 930, and 940. In one embodiment, the edge server 950 and the edge database 970 are not designated for distributed computing devices 920, 930, and 940. The distributed computing devices 920, 930, and 940 connect to an edge server in the edge computing network based on proximity, availability, latency, bandwidth, and/or other factors.

It is also contemplated that the computer system 900 is operable to not include all of the components shown in FIG. 9, is operable to include other components that are not explicitly shown in FIG. 9, or is operable to utilize an architecture completely different than that shown in FIG. 9. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Data Stored on a Distributed Ledger

In a preferred embodiment, the platform is operable to store data on a distributed ledger, e.g., a blockchain. Distributed ledger technology refers to an infrastructure of replicated, shared, and synchronized digital data that is decentralized and distributed across a plurality of machines, or nodes. The nodes include but are not limited to a mobile device, a computer, a server, and/or any combination thereof. Data is replicated and synchronized across a network of nodes such that each node has a complete copy of the distributed ledger. The replication and synchronization of data across a distributed set of devices provides increased transparency over traditional data storage systems, as multiple devices have access to the same set of records and/or database. Additionally, the use of distributed ledgers eliminates the need for third-party and/or administrative authorities because each of the nodes in the network is operable to receive, validate, and store additional data, thus creating a truly decentralized system. Eliminating the third-party and/or administrative authorities saves time and cost. A decentralized database is also more secure than traditional databases, which are stored on a single device and/or server because the decentralized data is replicated and spread out over both physical and digital space to segregated and independent nodes, making it more difficult to attack and/or irreparably tamper with the data. Tampering with the data at one location does not automatically affect the identical data stored at other nodes, thus providing greater data security.

In addition to the decentralized storage of the distributed ledger, which requires a plurality of nodes, the distributed ledger has further advantages in the way that data is received, validated, communicated, and added to the ledger. When new data is added to the distributed ledger, it must be validated by a portion of the nodes (e.g., 51%) involved in maintaining the ledger in a process called consensus. Proof of work, proof of stake, delegated proof of stake, proof of space, proof of capacity, proof of activity, proof of elapsed time, and/or proof of authority consensus are all compatible with the present invention, as are other forms of consensus known in the art. In one embodiment, the present invention uses fault-tolerant consensus systems. Each node in the system is operable to participate in consensus, e.g., by performing at least one calculation, performing at least one function, allocating compute resources, allocating at least one token, and/or storing data. It is necessary for a portion of the nodes in the system (e.g., 51% of the nodes) to participate in consensus in order for new data to be added to the distributed ledger. Advantageously, requiring that the portion of the nodes participate in consensus while all nodes are operable to participate in consensus means that authority to modify the ledger is not allocated to one node or even a group of nodes but rather is equally distributed across all of the nodes in the system. In one embodiment, a node that participates in consensus is rewarded, e.g., with a digital token, in a process called mining.

The blockchain is a commonly used implementation of a distributed ledger and was described in Satoshi Nakamoto's whitepaper Bitcoin: A Peer-to-Peer Electronic Cash System, which was published in October 2008 and which is incorporated herein by reference in its entirety. In the blockchain, additional data is added to the ledger in the form of a block. Each block is linked to its preceding block with a cryptographic hash, which is a one-way mapping function of the data in the preceding block that cannot practically be computed in reverse. In one embodiment, a timestamp is also included in the hash. The computation of the cryptographic hash based on data in a preceding block is a computationally intensive task that could not practically be conducted as a mental process. The use of cryptographic hashes means that each block is sequentially related to the block before it and the block after it, making the chain as a whole immutable. Data in a block in a preferred embodiment cannot be retroactively altered after it is added to the chain because doing so changes the associated hash, which affects all subsequent blocks in the chain and which breaks the mapping of the preceding block. The blockchain is an improvement on existing methods of data storage because it connects blocks of data in an immutable fashion. Additionally, the blockchain is then replicated and synchronized across all nodes in the system, ensuring a distributed ledger. Any attempted changes to the blockchain are propagated across a decentralized network, which increases the responsiveness of the system to detect and eliminate fraudulent behavior compared to non-distributed data storage systems. The blockchain and the distributed ledger solve problems inherent to computer networking technology by providing a secure and decentralized way of storing data that is immutable and has high fault tolerance. The distributed ledger stores digital data and is thus inextricably tied to computer technology. Additional information about the blockchain is included in The Business of Blockchain by William Mougavar published in April 2016, which is incorporated herein by reference in its entirety.

In one embodiment, the data added to the distributed ledger of the present invention include digital signatures. A digital signature links a piece of data (e.g., a block) to a digital identity (e.g., a user account). In one embodiment, the digital signature is created using a cryptographic hash and at least one private key for a user. The content of the piece of data is used to produce a cryptographic hash. The cryptographic hash and the at least one private key are used to create the digital signature using a signature algorithm. The digital signature is only operable to be created using a private key. However, the digital signature is operable to be decoded and/or verified using a public key also corresponding to the user. The separation of public keys and private keys means that external parties can verify a digital signature of a user using a public key but cannot replicate the digital signature since they do not have a private key. Digital signatures are not merely electronic analogs of traditional physical signatures. Physical signatures are easily accessible and easily replicable by hand. In addition, there is no standard algorithm to verify a physical signature except comparing a first signature with a second signature from the same person via visual inspection, which is not always possible. In one embodiment, the digital signatures are created using the data that is being linked to the digital identity whereas physical signatures are only related to the identity of the signer and are agnostic of what is being signed. Furthermore, digital signatures are transformed into a cryptographic hash using a private key, which is a proof of identity of which there is no physical or pre-electronic analog. Digital signatures, and cryptographic hashes in general, are of sufficient data size and complexity to not be understood by human mental work, let alone verified through the use of keys and corresponding algorithms by human mental work. Therefore, creating, decoding, and/or verifying digital signatures with the human mind is highly impractical.

Public, private, consortium, and hybrid blockchains are compatible with the present invention. In one embodiment, the blockchain system used by the present invention includes sidechains wherein the sidechains run parallel to a primary chain. Implementations of distributed ledger and/or blockchain technology including, but not limited to, BITCOIN, ETHEREUM, HASHGRAPH, BINANCE, FLOW, TRON, TEZOS, COSMOS, and/or RIPPLE are compatible with the present invention. In one embodiment, the platform includes at least one acyclic graph ledger (e.g., at least one tangle and/or at least one hashgraph). In one embodiment, the platform includes at least one quantum computing ledger.

In one embodiment, the present invention further includes the use of at least one smart contract, wherein a smart contract includes a set of automatically executable steps and/or instructions that are dependent on agreed-upon terms. The smart contract includes information including, but not limited to, at least one contracting party, at least one contract address, contract data, and/or at least one contract term. In one embodiment, the at least one smart contract is deployed on a blockchain such that the at least one smart contract is also stored on a distributed node infrastructure. In one embodiment, the terms of the at least one smart contract are dependent on changes to the blockchain. For example, a provision of the at least one smart contract executes when a new block is added to the blockchain that meets the terms of the at least one smart contract. The smart contract is preferably executed automatically when the new block is added to the blockchain. In one embodiment, a first smart contract is operable to invoke a second smart contract when executed. A smart contract is operable to capture and store state information about the current state of the blockchain and/or the distributed ledger at any point in time. Advantageously, a smart contract is more transparent than traditional coded contracts because it is stored on a distributed ledger.

Additionally, all executions of the smart contract are immutably stored and accessible on the distributed ledger, which is an improvement over non-distributed, stateless coded contracts. In one embodiment, the state information is also stored on a distributed ledger.

Cryptocurrency Transactions

Distributed ledger technology further enables the use of cryptocurrencies. A cryptocurrency is a digital asset wherein ownership records and transaction records of a unit of cryptocurrency (typically a token) are stored in a digital ledger using cryptography. Use of centralized cryptocurrencies and decentralized cryptocurrencies are both compatible with the present invention. Centralized cryptocurrencies are minted prior to issuance and/or are issued by a single body. Records of a decentralized cryptocurrency are stored on a distributed ledger (e.g., a blockchain), and any node participating in the distributed ledger is operable to mint the decentralized cryptocurrency. The distributed ledger thus serves as a public record of financial transactions. Cryptocurrencies are typically fungible in that each token of a given cryptocurrency is interchangeable. The present invention is operable to facilitate transactions of at least one cryptocurrency, including, but not limited to, BITCOIN, LITECOIN, RIPPLE, NXT, DASH, STELLAR, BINANCE COIN, and/or ETHEREUM. In one embodiment, the present invention is operable to facilitate transactions of stablecoins, NEO Enhancement Protocol (NEP) tokens, and/or BINANCE Chain Evolution Proposal (BEP) tokens. In one embodiment, the present invention is operable to support tokens created using the ETHEREUM Request for Comment (ERC) standards as described by the Ethereum Improvement Proposals (EIP). For example, the present invention is operable to support ERC-20-compatible tokens, which are created using the EIP-20: ERC-20 Token Standard, published by Vogelsteller, et al., on Nov. 19, 2015, which is incorporated herein by reference in its entirety.

A cryptocurrency wallet stores keys for cryptocurrency transactions. As cryptocurrency is a virtual currency, the ability to access and transfer cryptocurrency must be protected through physical and/or virtual means such that such actions are only operable to be performed by the rightful owner and/or parties with permission. In one embodiment, a cryptocurrency wallet stores a private key and a public key. In another embodiment, the cryptocurrency wallet is operable to create the private key and/or the public key, encrypt data, and/or sign data (e.g., with a digital signature). In one embodiment, the private key is generated via a first cryptographic algorithm wherein the input to the first cryptographic algorithm is random. Alternatively, the input to the first cryptographic algorithm is non-random. In one embodiment, the public key is generated from the private key using a second cryptographic algorithm. In one embodiment, the first cryptographic algorithm and the second cryptographic algorithm are the same. The private key is only accessible to the owner of the cryptocurrency wallet, while the public key is accessible to the owner of the cryptocurrency wallet as well as a receiving party receiving cryptocurrency from the owner of the cryptocurrency wallet. Deterministic and non-deterministic cryptocurrency wallets are compatible with the present invention.

As a non-limiting example, a cryptocurrency transaction between a first party and a second party involves the first party using a private key to sign a transaction wherein the transaction includes data on a first cryptocurrency wallet belonging to the first party, the amount of the transaction, and a second cryptocurrency wallet belonging to the second party. In one embodiment, the second cryptocurrency wallet is identified by a public key. The transaction is then populated to a distributed network wherein a proportion (e.g., 51%) of the nodes of the distributed network verify the transaction. Verifying the transaction includes verifying that the private key corresponds to the first cryptocurrency wallet and that the amount of the transaction is available in the first cryptocurrency wallet. The nodes then record the transaction on the distributed ledger, e.g., by adding a block to a blockchain. Fulfilling the cryptocurrency transaction is a computationally intensive process due to key cryptography and the consensus necessary for adding data to the distributed ledger that could not practically be performed in the human mind. In one embodiment, a node is operable to verify a block of transactions rather than a single transaction.

Desktop wallets, mobile wallets, hardware wallets, and web wallets are compatible with the present invention. A software wallet (e.g., a desktop wallet, a mobile wallet, a web wallet) stores private and/or public keys in software. A hardware wallet stores and isolates private and/or public keys in a physical unit, e.g., a universal serial bus (USB) flash drive. The hardware wallet is not connected to the internet or any form of wireless communication, thus the data stored on the hardware wallet is not accessible unless the hardware wallet is connected to an external device with network connection, e.g., a computer. In one embodiment, the data on the hardware wallet is not operable to be transferred out of the hardware wallet. In one embodiment, the hardware wallet includes further data security measures, e.g., a password requirement and/or a biometric identifier requirement. In one embodiment, the present invention is operable to integrate a third-party cryptocurrency wallet. Alternatively, the present invention is operable to integrate a payments platform that is compatible with cryptocurrency, including, but not limited to, VENMO, PAYPAL, COINBASE, and/or payments platforms associated with financial institutions.

Tokenization

In one embodiment, the platform is operable to tokenize assets. A token is a piece of data that is stored on the distributed digital ledger and that can be used to represent a physical and/or a digital asset, e.g., in a transaction, in an inventory. The token is not the asset itself; however, possession and transfer of the token are stored on the distributed digital ledger, thus creating an immutable record of ownership. In one embodiment, the token includes cryptographic hashes of asset data, wherein the asset data is related to the asset. In one embodiment, the asset data is a chain of data blocks. For example, the asset is a work of digital art, and the asset data includes data about the work such as information about an artist, a subject matter, a file type, color data, etc. The corresponding token includes a cryptographic hash of the asset data, which describes the work. Alternative mappings of the asset data to the token are also compatible with the present invention. In one embodiment, the token is a non-fungible token (NFT). A first non-fungible token is not directly interchangeable with a second non-fungible token; rather, the value of the first token and the second token are determined in terms of a fungible unit (e.g., a currency). In one embodiment, the platform is operable to support ETHEREUM standards for tokenization, including, but not limited to, HP-721: ERC-721 Non-Fungible Token Standard by Entriken, et al., which was published Jan. 24, 2018 and which is incorporated herein by reference in its entirety. In one embodiment, the platform is operable to create fractional NFTs (f-NFTs), wherein each f-NFT represents a portion of the asset. Ownership of an f-NFT corresponds to partial ownership of the asset.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for mutual exchange of data over a distributed ledger, comprising:
    creating a key for data encryption, wherein a sending party encrypts a data set using the key to create an encrypted data set;
    sending the encrypted data set to a data host platform, wherein the data host platform is implemented on a distributed ledger;
    generating a pointer upon receipt of the encrypted data set, wherein the pointer stores a memory of the location of the encrypted data set within the data host platform;
    encrypting the key using a public key associated with a receiving party to create an encrypted key;
    the data host platform receiving a request from the sending party to create at least one authorization token, wherein the at least one authorization token is created, wherein the at least one authorization token includes the encrypted key, the pointer, and a unique token address for association with the at least one authorization token;
    the data host platform transferring the at least one authorization token from a wallet address associated with the sending party to a wallet address associated with the receiving party upon receiving a request to transfer the at least one authorization token from the sending party;
    the data host platform receiving a decrypted key from the receiving party, wherein the receiving party decrypts the encrypted key using the private key associated with the public address to create the decrypted key and access the pointer;
    the data host platform receiving the pointer of the at least one authorization token indicating the location of encrypted data set from the receiving party, wherein the data host platform further encrypts the encrypted data set using the public key of the receiving party to create a twice encrypted data set;
    the data host platform sending the twice encrypted data set to the receiving party, wherein the receiving party decrypts the twice encrypted data set using a private key associated with the receiving party to access the encrypted key and the encrypted data set;
    the receiving party decrypting the encrypted key to access the key;
    decrypting the encrypted data set using the key, wherein the receiving party is able to view the data set upon decryption.

2. The method of claim 1, wherein the at least one authorization token is further operable to include at least one policy identified by a policy engine of the data host platform.

3. The method of claim 1, wherein the sending party signs and authorizes the request to create the at least one authorization token and/or the request to transfer the at least one authorization token.

4. The method of claim 1, wherein the exchange of the data set is conditional upon at least one transaction between the sending party and the receiving party, wherein the data host platform verifies the at least one transaction has occurred prior to sending the twice encrypted data to the receiving party.

5. The method of claim 1, wherein upon completion of at least one transaction between the sending party and the receiving party, the data set is made available to a third-party administrator.

6. The method of claim 1, wherein the sending party is an initiating Virtual Asset Service Provider (VASP) and the receiving party is a beneficiary VASP and/or a third-party administrator.

7. The method of claim 6, wherein the method is bilateral such that the VASP and/or the third-party administrator is the receiving party in a first execution of the method and the VASP and/or the third-party administrator is the sending party of a second execution of the method.

8. The method of claim 1, wherein the pointer is a hash pointer.

9. The method of claim 1, wherein the sending party is certified by a regulatory certification authority, wherein the receiving party is certified by the regulatory certification authority and/or verified by a trusted third-party VASP prior to sending the at least one authorization token.

10. The method of claim 1, wherein encryption of the key, the data set, and/or the encrypted data set is accomplished using symmetric and/or asymmetric encryption techniques.

* * * * *